US012662793B2

(12) United States Patent
Binstock et al.

(10) Patent No.: US 12,662,793 B2
(45) Date of Patent: Jun. 23, 2026

(54) SYSTEMS AND METHODS FOR ARTICULATED LOADERS

(71) Applicant: Doosan Bobcat North America, Inc., West Fargo, ND (US)

(72) Inventors: Mark Binstock, Bismarck, ND (US); Justin Hoeger, Bismarck, ND (US); Kenneth L. Dieter, Bismarck, ND (US); Shane Wagner, Bismarck, ND (US); Jonah Zimmerman, Lincoln, ND (US); Drew Asche, Bismarck, ND (US); Kevin Zent, Bismarck, ND (US)

(73) Assignee: Doosan Bobcat North America, Inc., West Fargo, ND (US)

( * ) Notice: Subject to any disclaimer, the term of this patent is extended or adjusted under 35 U.S.C. 154(b) by 492 days.

(21) Appl. No.: 18/168,922

(22) Filed: Feb. 14, 2023

(65) Prior Publication Data
US 2023/0257958 A1      Aug. 17, 2023

Related U.S. Application Data

(60) Provisional application No. 63/309,736, filed on Feb. 14, 2022.

(51) Int. Cl.
*E02F 3/28* (2006.01)
*B60H 1/00* (2006.01)
(Continued)

(52) U.S. Cl.
CPC ......... *E02F 3/283* (2013.01); *B60H 1/00328* (2013.01); *B60H 1/00378* (2013.01);
(Continued)

(58) Field of Classification Search
CPC ......... E02F 3/283; E02F 3/431; E02F 9/0866; E02F 9/0883; E02F 9/16; E02F 9/0841;
(Continued)

(56) References Cited

U.S. PATENT DOCUMENTS 10,287,962 B2 * 5/2019 Kurokawa ............. B62D 49/06
10,480,154 B2 * 11/2019 Breuer .................. E02F 3/4135
(Continued)

FOREIGN PATENT DOCUMENTS

CN        114855917 A  * 8/2022  ......... B60H 1/00357
DE  102023110607 A1 * 11/2023  ............... G06T 3/12
(Continued)

OTHER PUBLICATIONS

JP-2005282239-A English Translation (Year: 2005).*
(Continued)

*Primary Examiner* — Michael T. Walsh
(74) *Attorney, Agent, or Firm* — Quarles & Brady LLP

(57) ABSTRACT
Systems and methods for a power machine can provide greater functionality and operator comfort. A climate control system for a power machine can include a condenser, mounted on a front frame member of the power machine. Paths for air flow to cool an engine compartment can extend along airflow passages though a fuel tank. Secondary braking systems can allow a power machine to be stopped with modulated fashion when a primary power source is unavailable. Rear-view vision systems can include a camera mounted on a front pivoting frame (e.g., near the top of an operator station) to provide improved environmental information to an operator. A tilt actuator of the power machine can be configured to operate in a float mode.

22 Claims, 20 Drawing Sheets

(51) Int. Cl.

| | |
|---|---|
| *B60K 11/06* | (2006.01) |
| *B60K 15/073* | (2006.01) |
| *B60R 1/26* | (2022.01) |
| *B60T 8/92* | (2006.01) |
| *B60T 13/58* | (2006.01) |
| *B60T 13/68* | (2006.01) |
| *E02F 3/43* | (2006.01) |
| *E02F 9/08* | (2006.01) |
| *E02F 9/16* | (2006.01) |

(52) U.S. Cl.
CPC ............ *B60K 11/06* (2013.01); *B60K 15/073* (2013.01); *B60R 1/26* (2022.01); *B60T 8/92* (2013.01); *B60T 13/588* (2013.01); *B60T 13/686* (2013.01); *E02F 3/431* (2013.01); *E02F 9/0866* (2013.01); *E02F 9/0883* (2013.01); *E02F 9/16* (2013.01); *B60T 2270/402* (2013.01)

(58) Field of Classification Search
CPC ............... E02F 9/0858; B60H 1/00328; B60H 1/00378; B60K 11/06; B60K 15/073; B60R 1/26; B60T 8/92; B60T 13/588; B60T 13/686; B60T 2270/402
See application file for complete search history.

(56) References Cited

U.S. PATENT DOCUMENTS

| | | | | |
|---|---|---|---|---|
| 11,168,712 B2 * | 11/2021 | Zent | ......................... | F15B 11/22 |
| 11,305,812 B2 * | 4/2022 | Zent | ...................... | B62D 12/00 |
| 11,485,194 B2 * | 11/2022 | Binstock | ............ | B60H 1/00378 |
| 11,993,208 B2 * | 5/2024 | Freeman-Powell | ..... | G06T 11/60 |
| 2017/0030051 A1 * | 2/2017 | Melchiori | ............ | E02F 9/0841 |
| 2020/0271143 A1 * | 8/2020 | Binstock | ............... | E02F 9/2267 |

FOREIGN PATENT DOCUMENTS

| | | | | | |
|---|---|---|---|---|---|
| JP | 2005282239 | A | * | 10/2005 | |
| JP | 3773600 | B2 | * | 5/2006 | |
| WO | WO-2012157379 | A1 | * | 11/2012 | ............. E02F 9/261 |
| WO | 2013179697 | A1 | | 12/2013 | |

OTHER PUBLICATIONS

DE-102023110607-A1 English Translation (Year: 2023).*
JP-3773600-B2 English Translation (Year: 2006).*
CN-114855917-A English Translation (Year: 2022).*
WO-2012157379-A1 English Translation (Year: 2012).*
International Searching Authority, International Search Report and Written Opinion from corresponding PCT Application No. PCT/US2023/062574, mailed Jul. 7, 2023 (15 pgs).

\* cited by examiner

SYSTEMS AND METHODS FOR ARTICULATED LOADERS

CROSS-REFERENCE TO RELATED APPLICATIONS

This application claims priority to and hereby incorporates by reference U.S. Provisional Patent Application No. 63/309,736, filed Feb. 14, 2022.

BACKGROUND

This disclosure is directed toward power machines. More particularly, this disclosure is directed to articulated loaders that have a front frame member and a rear frame member pivotably coupled to the front frame member about a vertical axis. Power machines, for the purposes of this disclosure, include any type of machine that generates power to accomplish a particular task or a variety of tasks. One type of power machine is a work vehicle. Work vehicles, such as loaders, are generally self-propelled vehicles that have a work device, such as a lift arm (although some work vehicles can have other work devices) that can be manipulated to perform a work function. Work vehicles include loaders (including mini-loaders), excavators, utility vehicles, mowers, tractors (including compact tractors), and trenchers, to name a few examples.

The discussion above is merely provided for general background information and is not intended to be used as an aid in determining the scope of the claimed subject matter.

SUMMARY

Power machines and related systems and methods as disclosed herein, including articulated loaders in particular, can include different systems to improve functionality and operator experience while operating the machine. For example, among other improvements, different implementations can provide power machines with improved arrangements of components of air conditioning systems, improved airflow systems for engine cooling, improved modulated braking systems, improved configurations for rearview cameras, and power systems configured to operate a tilt actuator in a float mode.

Some of the disclosed examples provide a power machine with a main frame that includes a front frame member and a rear frame member pivotally coupled to the front frame member. The front frame member can support an operator station and, in some cases, the rear frame member can support a power source for the power machine. A work element can be supported by the main frame and can be configured to be controllably operated using power from the power source. A climate control system can regulate temperature for the operator station and can include a condenser for rejecting heat from the climate control system. The condenser can be supported by the front frame member and located at least partly forward of the operator station.

In some examples, the operator station can include a cab, including a lateral side wall on a first lateral side of the power machine. The condenser can be secured to the lateral side wall.

In some examples, a rotational axis of a fan of the condenser can extend transverse to a front-to-back axis of the main frame (e.g., perpendicular, or substantially perpendicular to the axis).

In some examples, the condenser can be hingedly secured to the lateral side wall.

In some examples, the power source can be supported on the rear frame member.

Some of the disclosed examples provide a power machine with a main frame that supports a power system for the power machine within an internal area of the power machine. The power system can include an engine. A work element can be supported by the main frame and configured to be controllably operated using power from the engine. A vent can be aligned to direct air flow from outside of the main frame into the internal area to cool the engine. A fluid (e.g., fuel) tank for the power system can be aligned between the engine and the vent. The fluid tank can include one or more external walls that define an internal fluid storage volume. One or more airflow passages can extend through the fluid tank to provide air flow to cool the engine, the airflow passages being at least partly bounded by at least one of the one or more external walls.

In some examples, at least one of the airflow passages can be fully laterally bounded by the at least one of the external walls, relative to a flow direction of the air flow through the at least one airflow passage.

In some examples, the one or more airflow passages can include a first airflow passage and a second airflow passage, spaced apart from each other in a front-to-back direction of the power machine so that the internal fluid storage volume extends between the first and second airflow passages.

In some examples, the first airflow passage can be vertically offset relative to the second airflow passage.

In some examples, at least one component of the power system of the power machine can extend into at least one of the one or more airflow passages.

In some examples, the main frame can include a front frame member and a rear frame member pivotally coupled to the front frame member.

In some examples, the fluid tank can be a fuel tank for the engine.

Some of the disclosed examples provide a fuel tank for a power machine. The fuel tank can include an outer shell that defines an internal fuel storage volume. The outer shell can include at least one airflow passage that is laterally, relative to a flow direction through the at least one airflow passage, surrounded by the internal fuel storage volume to provide a flow path for cooling air flow for an engine of the power machine.

In some example, the outer shell can include a plurality of airflow passages to provide a plurality of flow paths for the cooling air flow.

In some example, one or more of a fuel pickup or a fuel sensor can extend through the internal fuel storage volume between at least two of the flow paths.

Some of the disclosed examples provide a brake system for a power machine having a drive system and a hydraulic pump. The brake system can include one or more brakes arranged to mechanically brake the drive system in the absence of a threshold hydraulic signal. A secondary brake control system can be arranged along a flow path from the hydraulic pump to the one or more brakes. The secondary brake control system can include a check valve, a secondary brake control valve that is downstream of the check valve, and a hydraulic accumulator that is downstream of the check valve and upstream of the secondary brake control valve. In this arrangement, flow from the hydraulic pump across the check valve can charge the hydraulic accumulator. The secondary brake control valve can be operable to selectively permit flow from the accumulator to the one or more brakes, to release the one or more brakes in the absence of flow from the hydraulic pump.

In some examples, the secondary brake control valve can be a spool valve with at least two spool positions, operable based on electronic control signals from an operator input device of the power machine.

Some of the disclosed examples provide a method of braking a power machine in the absence of hydraulic flow from a hydraulic pump of the power machine. The hydraulic pump can be operated to provide a hydraulic signal to release one or more brakes of the power machine and to charge an accumulator of a secondary brake control system. The one or more brakes can be arranged to mechanically brake a drive system of the power machine in the absence of a threshold hydraulic signal. During travel of the power machine, with the one or more brakes applying braking power due to ceased flow from the hydraulic pump, an operator input signal can be received to command a modulation of braking. Based on the operator input signal, release of pressure from the accumulator to the one or more brakes can be controlled to reduce the applied braking power.

Some of the examples disclosed provide a power machine with a main frame that includes a front frame member and a rear frame member pivotally coupled to the front frame member about a vertical axis. The front frame member can support an operator station with an operator station frame. The rear frame member can support a power source for the power machine and a rear exterior body. A work element can be supported by the main frame and can be configured to be controllably operated using power from the power source. A rearview vision system can include a camera supported by the operator station frame to provide a rearward view. The rearward view can include at least part of the rear exterior body.

In some examples, the front frame member can support an operator station with an operator station frame and the camera can be supported by the operator station frame to provide a rearward view that can include at least part of a rear exterior body supported by the rear frame member.

In some examples, the camera can be supported by the operator station frame so that the rearward view can include a top rear edge of the rear exterior body.

In some examples, the camera can be secured to the operator station frame so that an imaging sensor of the camera can be within a distance from a top of the operator station frame that is 20% or less of a total height of the power machine.

In some examples, the camera can be secured to the operator station frame so that the imaging sensor of the camera can be within a distance from a top of the operator station frame that is 5% or less of a total height of the power machine.

In some examples, the camera can be secured to the operator station frame so that the imaging sensor of the camera can be within a distance from a top of the operator station frame that is 3% or less of a total height of the power machine.

In some examples, the camera can be supported by the operator station frame so that: with the power machine in a neutral orientation, a field of view of the camera defines a reference point at a back end of the power machine that is furthest laterally removed from a centerpoint of the field of view, relative to a front-to-back direction; and with the power machine in a minimum turn-radius orientation, the reference point remains within the field of view.

Some of the examples disclosed provide a power machine with a main frame that includes a front frame member and a rear frame member pivotally coupled to the front frame member about a vertical axis. A work element can be supported by the main frame and can be configured to be controllably operated using power from a power source supported by the main frame. A rearview vision system can include a camera supported by the operator station frame to provide a rearward view.

Some of the examples disclosed provide a power machine with a main frame of the power machine can include a front frame member and a rear frame member pivotally coupled to the front frame member about a vertical axis. The front frame member can support an operator station that includes an operator station frame. The rear frame member can support a power source for the power machine and a rear exterior body. A lift arm assembly can be supported by the main frame and can be configured to be raised and lowered by a lift actuator powered by the power source. The lift arm assembly can include a lift arm structure, an implement carrier pivotally secured to the lift arm structure, and a tilt actuator that is pivotally secured to the lift arm structure and the implement carrier. The tilt actuator can be operably arranged to be powered by the power source to change an attitude of the implement carrier relative to the lift arm structure. A control system can include one or more control devices configured to selectively implement a tilt float mode for the lift arm assembly. In the tilt float mode, the control system can control the tilt actuator to permit movement of the tilt actuator in response to an external force.

In some examples, the tilt actuator can be a hydraulic tilt cylinder with a rod end and a base end in communication with a hydraulic system of the power machine that includes a low pressure hydraulic reservoir and a pump configured to operably power movement of the hydraulic tilt cylinder. Controlling the tilt actuator to permit the movement of the tilt actuator in response to external force can include the control system controlling one or more valves of the hydraulic system to open the rod and base ends of the tilt actuator to the low pressure hydraulic reservoir.

In some examples, the control system can be further configured to selectively implement the tilt float mode based on an operator input.

Some of the examples disclosed provide a method of controlling a power machine with an articulated frame. An operator input can be received. Based on the operator input, a tilt float mode for a lift arm assembly of the power machine can be implemented. In the tilt float mode, a hydraulic system of the power machine can be operated to permit an implement carrier to change attitude relative to the main lift arm structure in response to an external force.

This Summary and the Abstract are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter.

DRAWINGS

FIGS. 12 and 13 are perspective partial views showing generally the rear portion of the power machine of FIG. 5, including a cooling system and a fuel tank according to an example of the disclosure.

DESCRIPTION

Figure 1:
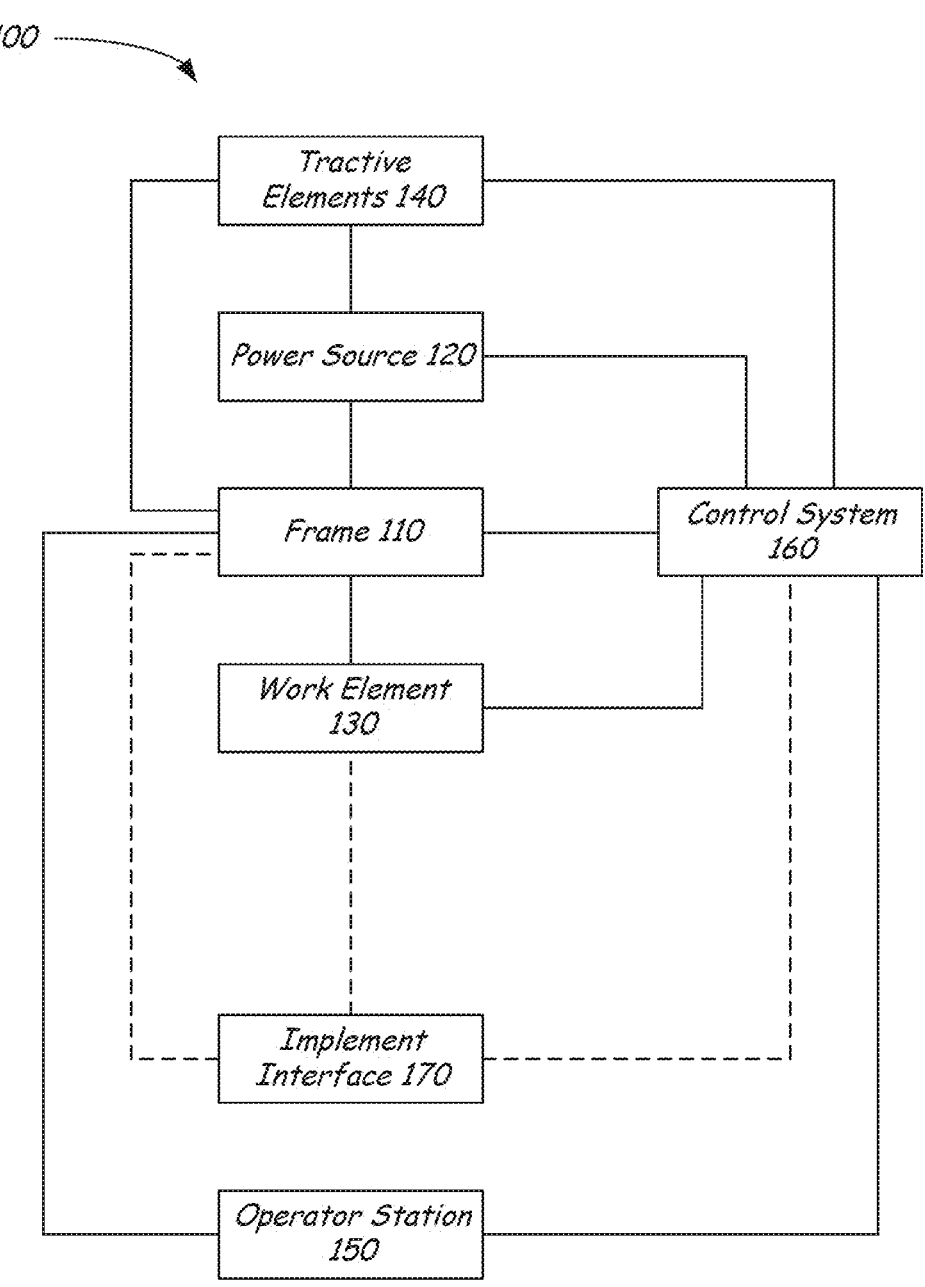
FIG. 1 is a block diagram illustrating functional systems of a representative power machine on which examples of the present disclosure can be advantageously practiced.

The concepts disclosed in this discussion are described and illustrated by referring to exemplary configurations. These concepts, however, are not limited in their application to the details of construction and the arrangement of components in the illustrative examples and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

As generally noted above, some power machines (e.g., articulated loaders) can include climate control systems for controlling the climate of an operator station to provide comfort to an operator. Climate control systems (e.g., heating and air conditioning systems) typically include a condenser which operates to reject heat from a system, for example, by providing airflow across coils containing heated gas so that condensation of the gas results in heat being expelled external to the space to be cooled. Fans can be included in the condenser to provide airflow to increase the rate of heat transfer, in some cases.

According to some examples disclosed herein, improved arrangements of components of a climate control system can be provided. For example, a condenser for an air conditioning system of a power machine can be mounted on a front frame of a power machine that has an articulatable or articulation joint between the front frame and a rear frame. Further, the condenser can be positioned so that the axis of rotation of the fan is transverse to a front-to-back direction (e.g., extends laterally away from a lift arm or other work group element of the power machine). In this orientation, the main air outlet of the condenser can be oriented out of typical paths of debris that could otherwise fall onto the condenser (e.g., from the work group) and thereby degrading components of the condenser. For improved stability and other benefits (e.g., relative to access for maintenance), the condenser can be mounted on a plate of the power machine that also provides roll over protection and falling object protection for the machine. For example, the condenser can be mounted to a structural side wall of a cab or other operator station, along with one or more hydraulic components. Correspondingly, in some cases, airflow across the condenser can also flow across other system components in addition to the condenser and can provide additional benefit in cooling other systems of the power machine.

Also as generally noted above, power machine components and particularly power source components (e.g., internal combustion engines) can generate heat during operation of the machine that must be appropriately managed in some cases to prevent overheating damage to the power machine. In some power machines (e.g., articulated loaders), engine components or other similar internal areas (e.g., partly enclosed spaces for other power sources and related systems) are housed in a rear (e.g., articulatable) frame of the power machine, and are primarily cooled through air flow from the environment outside the power machine In some examples, improved airflow paths for cooling of power sources of a power machine can be provided. For example, a fluid holding tank (e.g. a fuel tank) can be arranged on a rear frame of a power machine, in alignment with a vent between an engine compartment (or other interior area) and the surrounding environment. Further, passages in the fluid holding tank that extend through (e.g., are surrounded laterally by, relative to a main flow direction) a storage volume of the tank can provide an air flow path through the outer envelope of the tank, rather than simply around the tank. For example, one or more air flow passages can be formed as laterally enclosed tunnels that extend through a fluid holding tank in a lateral direction, to provide air flow paths that extend through the fluid holding tank between a vent from ambient and an engine compartment.

In some examples, air flow passages of a fluid holding tank can also accommodate improved packaging arrangements for other components in the machine, including with component of a power source or related systems (e.g., a turbocharger, etc.) extending partly into one or more of the passages through the fluid holding tank as can increase the available space for those components as compared to conventional designs. In some cases, air flow passages through a fluid holding tank can be sized and positioned to enable sensing and other components, including fuel level sensors and fuel pick-up tubes to extend from the top of the tank to the bottom between a set of air flow passages.

Some examples can provide an improved braking system that allows an operator to apply modulated braking to the machine when a primary power source for the braking system is unavailable. For example, a braking system according to some configurations can include a hydraulic accumulator to store hydraulic pressure for use for braking control when a primary pressure source for braking control (e.g., charge pressure from a charge pump) is no longer available. In some configurations, a check valve can allow pressurized flow to the hydraulic accumulator during normal operation and also prevent depressurization of the system when the charge pressure is no longer provided. With this arrangement, for example, normal operation of a charge pump can charge the accumulator, and an operator can then selectively control release of pressure from the accumulator to control a braking operation (e.g., to selectively release default-on brakes) when flow from the charge pump is no longer available (e.g., due to loss of power to the charge pump). For example, an operator can control a valve of the system to selectively allow pressure to drain from the accumulator to disengage the brakes, thereby providing modulated braking (e.g., as required by regulatory standards) and enabling the operator to controllably slow the power machine to a stop when primary braking (e.g., charge) pressure is unavailable.

As also noted above, power machines (e.g., articulated loaders) can have rearview vision systems with one or more rearview cameras to assist an operator in backing up the machine. In particular, operators can benefit from being able to see objects behind them while backing up, as well as have a view of the ground.

In some examples, in the context of articulated power machines (e.g., articulated loaders) in which a rear frame can pivot relative to a front frame, a rearview vision system can include a rearview camera that is located to provide improved environmental data to operators during reverse travel (and at other times). In particular, some examples may provide a rearview camera for a power machine that can allow an operator of the machine to keep a rear portion of the machine in view while executing straight and turning reverse travel, while also providing a useful view of the surrounding environment (e.g., the ground) behind the machine. For example, a rearview camera can be mounted to a front frame of an articulated loader, at a sufficient height above and appropriate corresponding angle relative to the back of the rear frame to ensure that a portion of the rear frame remains in the field of view of the rearview camera across a range of pivoted orientations (e.g., over a range that includes a maximum pivot angle of the rear frame relative to the front frame).

In some examples, a rearview camera can be mounted at or near the top of an operator station that is itself mounted on, or integral to, the front frame of the loader (e.g., with an aperture, imaging sensor, or lens assembly spaced from the top of the operator station by 20% or less of a total height, H, of the loader). So mounted, for example, the rearview camera can provide a field of view that includes at least a portion of the rear frame of the machine, including as the rear frame pivots relative to the front frame, which can provide useful environmental information for the operator in guiding travel of the power machine. Additionally, the height at which the camera is mounted can also provide=a view of the ground immediately behind the machine, which can provide the operator with the ability to avoid backing over objects the operator may not otherwise have seen.

In some examples, control systems for a power machine can be configured to selectively implement a float mode of operation for one or more actuators (e.g., arrange an associated actuator system to permit an actuator to move under external loads without actively powered resistance to the movement by the actuator). In particular, some examples can include control systems configured to provide a float mode of operation for a tilt actuator of a work group that is arranged to change an attitude of an implement relative to a lift arm of the work group. Thus, for example, in normal operation, a height of the lift arm and an attitude of the implement carrier can be actively controlled by the operator via commands to the lift actuator and the tilt actuator, respectively. Further, a tilt float mode can be selectively implemented, so that the tilt actuator can float relative to the attitude of the implement carrier to provide floating operation.

In some cases, operation of a tilt actuator in a float mode can provide notable benefits over similar operation of (e.g., only of) a lift cylinder, including in cases in which the lift cylinder is locked (e.g., to hold the associated lift arm at a particular height or a fixed angle). For example, when a power machine executes back-dragging operations (e.g., to level a portion of the ground), operation of a lift actuator in float mode can be beneficial but can also result in mechanical disadvantages or inefficiencies, including when the lift arm is oriented at a relatively large angle relative to horizontal (e.g., about 50 degrees or more). Indeed, for certain lift arm angles and terrain, operation of a lift actuator in tilt mode can result in undesired force being applied upward on an edge of an attached implement. This undesired force can damage the implement in some case and can also generally exert an unfavorable lift force on the power machine as a whole, in some cases lifting a portion of the power machine off the ground with corresponding detrimental effects on operational performance. To address these and other disadvantages with the conventional systems described above, a float mode can be provided for a tilt actuator instead of, or in addition to, a float mode for a lift actuator. For example, a hydraulic system can be controlled so that a height of the lift arm can be fixed (e.g., held substantially constant relative to a main frame of a power machine), while the tilt of the implement carrier can be in a float mode and thus movable in response to external loads.

Figure 2:
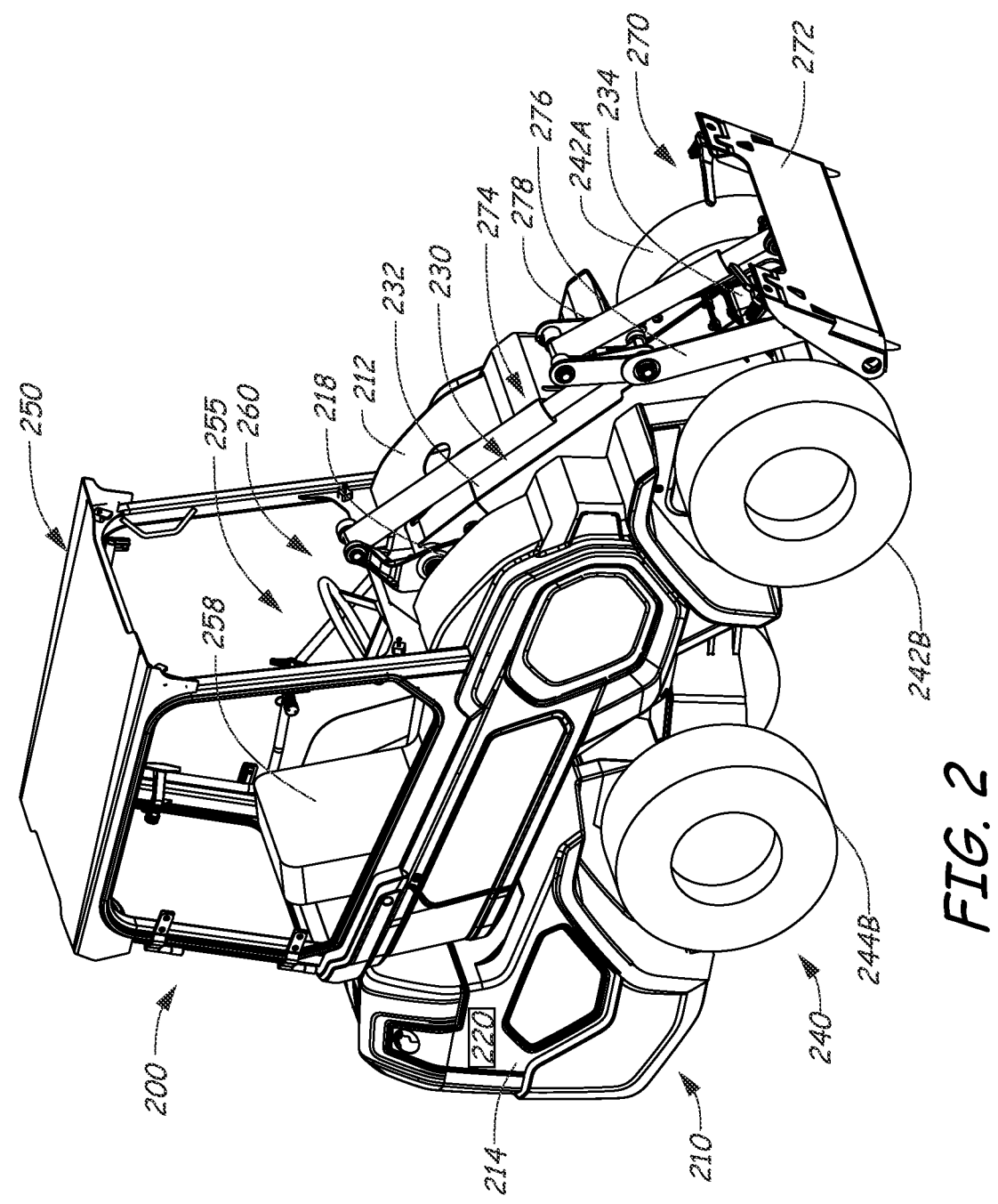
FIG. 2 is a perspective view showing generally a front of a power machine in the form of a small articulated loader on which examples disclosed in this specification can be advantageously practiced.
Figure 3:
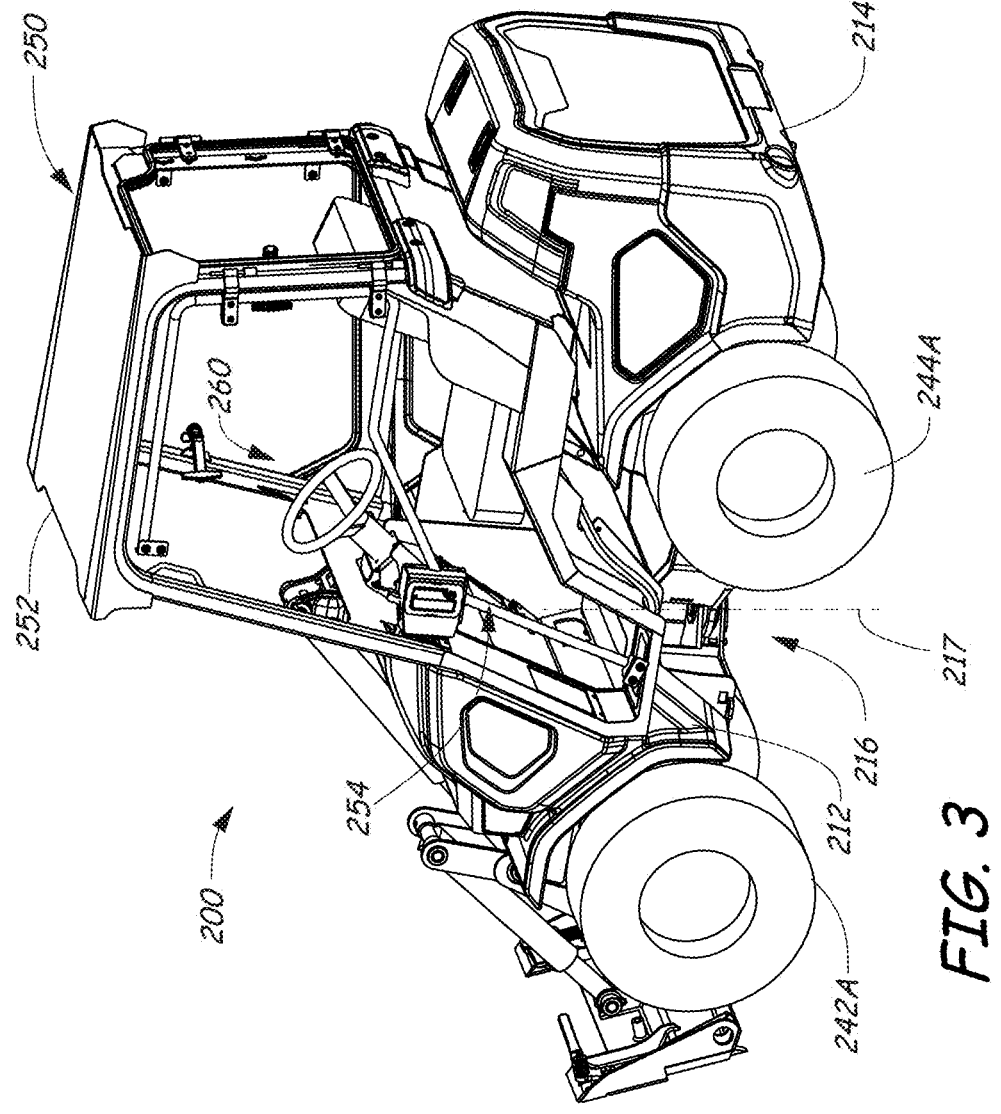
FIG. 3 is a perspective view showing generally a back of the power machine shown in FIG. 2.

These concepts can be practiced on various power machines, as will be described below. A representative power machine on which the disclosed technology can be practiced is illustrated in diagram form in FIG. 1 and one example of such a power machine is illustrated in FIGS. 2-3 and described below before any examples are disclosed. For the sake of brevity, only one power machine is discussed. However, as mentioned above, the examples below can be practiced on any of a number of power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

FIG. 1 is a block diagram that illustrates the basic systems of a power machine 100, which can be any of a number of different types of power machines and upon which the examples discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator. For example, the control system 160 can be an integrated or distributed architecture of one or more processor devices and one or more memories that are collectively configured to receive operator input or other input signals (e.g., sensor data) and to output commands accordingly for power machine operations.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. In some instances, the implement can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, the implement carrier is fixed to the implement (i.e., not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work elements with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which can provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that are capable of using it to perform a work function. Power sources for power machines typically include an engine such as an internal combustion engine and a power conversion system such as a mechanical transmission or a hydraulic system that can convert the output from an engine into a form of power that is usable by a work element. Other types of power sources can be incorporated into power machines, including electrical sources or a combination of power sources, known generally as hybrid power sources.

FIG. 1 shows a single work element designated as a work element 130, but various power machines can have any number of work elements. Work elements are typically attached to the frame of the power machine and movable with respect to the frame when performing a work task. In some examples, as also discussed above, work elements can include lift arm assemblies. In some examples, work elements can include mower decks or other similar equipment. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, wheels attached to an axle, track assemblies, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed technology may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether they have operator compartments, operator positions or neither, may be capable of being operated remotely (i.e., from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e., remote from both the power machine and any implement to which is it coupled) that is capable of controlling at least some of the operator-controlled functions on the power machine.

FIGS. 2-3 illustrate a loader 200, which is one particular example of a power machine of the type illustrated in FIG. 1 where the examples discussed below can be advantageously employed. Loader 200 is an articulated loader with a front mounted lift arm assembly 230, which in this example is a telescopic lift arm. Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. The description herein of loader 200 with references to FIGS. 2-3 provides an illustration of the environment in which the examples discussed below can be practiced and this description should not be considered limiting especially as to the description of features of the loader 200 that are not essential to the disclosed technology. Such features may or may not be included in power machines other than loader 200 upon which the examples disclosed below may be advantageously practiced. Unless specifically noted otherwise, examples disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220 that can generate or otherwise provide power for operating various functions on the power machine. Frame 210 also supports a work element in the form of lift arm assembly 230 that is powered by the power system 220 and that can perform various work tasks. As loader 200 is a work vehicle, frame 210 also supports a traction system 240, which is also powered by power system 220 and can propel the power machine over a support surface. The lift arm assembly 230 in turn supports an implement interface 270 that includes an implement carrier 272 that can receive and secure various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices to cause the power machine to perform various work functions. Cab 250 includes a canopy 252 that provides a roof for the operator compartment and is configured to have an entry 254 on one side of the seat (in the example shown in FIG. 3, the left side) to allow for an operator to enter and exit the cab 250. Although cab 250 as shown does not include any windows or doors, a door or windows can be provided.

The operator station 255 includes an operator seat 258 and the various operation input devices 260, including control levers that an operator can manipulate to control various machine functions. Operator input devices can include a steering wheel, buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, or mechanical signals. Signals generated in response to operator input devices are provided to various components on the power machine for controlling various functions on the power machine (e.g., via intervening electronic, hydraulic, or other control devices of generally known types). Among the functions that are controlled via operator input devices on power machine 100 include control of the tractive system 240, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example, audible or visual indications. Audible indications can be made in the form of buzzers, bells, and the like or via verbal communication. Visual indications can be made in the form of graphs, lights, icons, gauges, alphanumeric characters, and the like. Displays can be dedicated to providing dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such as walk behind loaders, for example, may not have a cab nor an operator compartment, nor a seat. The operator position on such loaders is generally defined relative to a position where an operator is best suited to manipulate operator input devices.

Various power machines that can include or interact with the examples discussed below can have various different frame components that support various work elements. The elements of frame 210 discussed herein are provided for illustrative purposes and should not be considered to be the only type of frame that a power machine on which the examples can be practiced can employ. As mentioned above, loader 200 is an articulated loader and as such has two frame members that are pivotally coupled together at an articulation joint. For the purposes of this document, frame 210 refers to the entire frame of the loader. Frame 210 of loader 200 includes a front frame member 212 and a rear frame member 214. The front and rear frame members 212, 214 are coupled together at an articulation joint 216. Actuators (not shown) are provided to rotate the front and rear frame members 212, 214 relative to each other about an axis 217 to accomplish a turn.

The front frame member 212 supports and is operably coupled to the lift arm 230 at joint 216. A lift arm cylinder (not shown, positioned beneath the lift arm 230) is coupled to the front frame member 212 and the lift arm 230 and is operable to raise and lower the lift arm under power. The front frame member 212 also supports front wheels 242A and 242B. Front wheels 242A and 242B are mounted to rigid axles (the axles do not pivot with respect to the front frame member 212). The cab 250 is also supported by the front frame member 212 so that when the front frame member 212 articulates with respect to the rear frame member 214, the cab 250 moves with the front frame member 212 so that it will swing out to either side relative to the rear frame member 214, depending on which way the loader 200 is being steered.

The rear frame member 214 supports various components of the power system 220 including an internal combustion engine. In addition, one or more hydraulic pumps are coupled to the engine and supported by the rear frame member 214. The hydraulic pumps are part of a power conversion system to convert power from the engine into a form that can be used by actuators (such as cylinders and drive motors) on the loader 200. Power system 220 is discussed in more detail below. In addition, rear wheels 244A and 244B are mounted to rigid axles that are in turn mounted to the rear frame member 214. When the loader 200 is pointed in a straight direction (i.e., the front frame portion 212 is aligned with the rear frame portion 214), a portion of the cab is positioned over the rear frame portion 214.

The lift arm assembly 230 shown in FIGS. 2-3 is one example of many different types of lift arm assemblies that can be attached to a power machine such as loader 200 or other power machines on which examples of the present discussion can be practiced. The lift arm assembly 230 is a radial lift arm assembly, in that the lift arm is mounted to the frame 210 at one end of the lift arm assembly and pivots about the mounting joint 216 as it is raised and lowered. The lift arm assembly 230 is also a telescoping lift arm. The lift arm assembly includes a boom 232 that is pivotally mounted to the front frame member 212 at joint 216. A telescoping member 234 is slidably inserted into the boom 232 and a telescoping cylinder (not shown) is coupled to the boom and the telescoping member and is operable to extend and retract the telescoping member under power. The telescoping member 234 is shown in FIGS. 2 and 3 in a fully retracted position. The implement interface 270 including implement carrier 272 and power couplers 274 are operably coupled to the telescoping member 234. An implement carrier mounting structure 276 is mounted to the telescoping member. The implement carrier 272 and the power couplers 274 are mounted to the positioning structure. A tilt cylinder 278 is pivotally mounted to both the implement carrier mounting structure 276 and the implement carrier 272 and is operable to rotate the implement carrier with respect to the implement carrier mounting structure under power. Among the operator controls 260 in the operator station 255 (e.g., within an enclosed compartment defined partly by the structure of the cab 250, as shown) are operator controls to allow an operator to control the lift, telescoping, and tilt functions of the lift arm assembly 230.

Other lift arm assemblies can have different geometries and can be coupled to the frame of a loader in various ways to provide lift paths that differ from the radial path of lift arm assembly 230. For example, some lift paths on other loaders provide a radial lift path. Others have multiple lift arms coupled together to operate as a lift arm assembly. Still other lift arm assemblies do not have a telescoping member.

Others have multiple segments. Unless specifically stated otherwise, none of the inventive concepts set forth in this discussion are limited by the type or number of lift arm assemblies that are coupled to a particular power machine.

Figure 4:
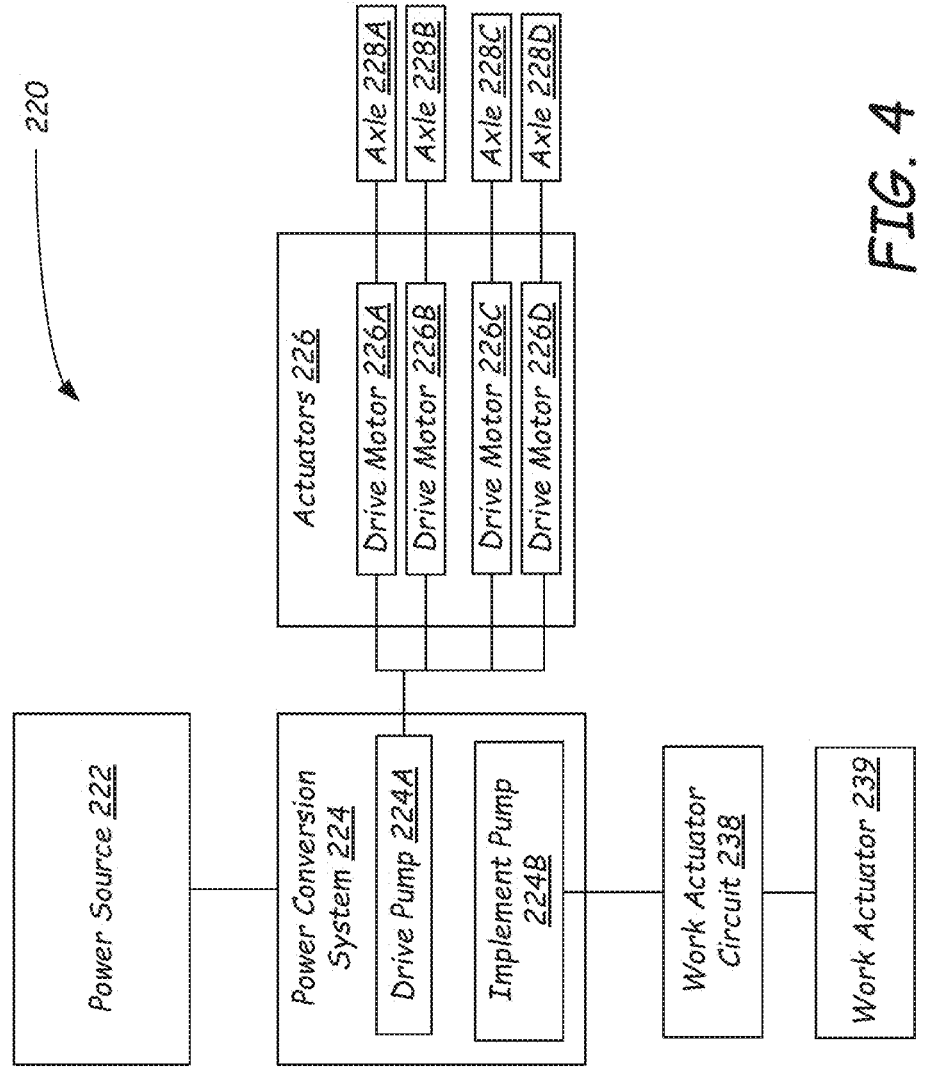
FIG. 4 is a block diagram illustrating components of a hydraulic power system of a loader such as the loader of FIGS. 2 and 3.

FIG. 4 illustrates power system 220 in more detail. Broadly speaking, power system 220 includes one or more power sources 222 that can generate or store power for operating various machine functions. On loader 200, the power system 220 includes an internal combustion engine. Other power machines can include electric generators, rechargeable batteries, various other power sources or any combination of power sources that can provide power for given power machine components. The power system 220 also includes a power conversion system 224, which is operably coupled to the power source 222. Power conversion system 224 is, in turn, coupled to one or more actuators 226, which can perform a function on the power machine. Power conversion systems in various power machines can include various components, including mechanical transmissions, hydraulic systems, and the like. The power conversion system 224 of power machine 200 includes a hydrostatic drive pump 224A, which provides a power signal to drive motors 226A, 226B, 226C and 226D. The four drive motors 226A, 226B, 226C and 226D in turn are each operably coupled to four axles, 228A, 228B, 228C and 228D, respectively. Although not shown, the four axles are coupled to the wheels 242A, 242B, 244A, and 244B, respectively. The hydrostatic drive pump 224A can be mechanically, hydraulically, or electrically coupled to operator input devices to receive actuation signals for controlling the drive pump. The power conversion system also includes an implement pump 224B, which is also driven by the power source 222. The implement pump 224B is configured to provide pressurized hydraulic fluid to a work actuator circuit 238. Work actuator circuit 238 is in communication with work actuator 239. Work actuator 239 is representative of a plurality of actuators, including the lift cylinder, tilt cylinder, telescoping cylinder, and the like. The work actuator circuit 238 can include valves and other devices to selectively provide pressurized hydraulic fluid to the various work actuators represented by block 239 in FIG. 4. In addition, the work actuator circuit 238 can be configured to provide pressurized hydraulic fluid to work actuators on an attached implement.

The description of power machine 100 and loader 200 above is provided for illustrative purposes, to provide illustrative environments on which the examples discussed below can be practiced. While the examples discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 5:
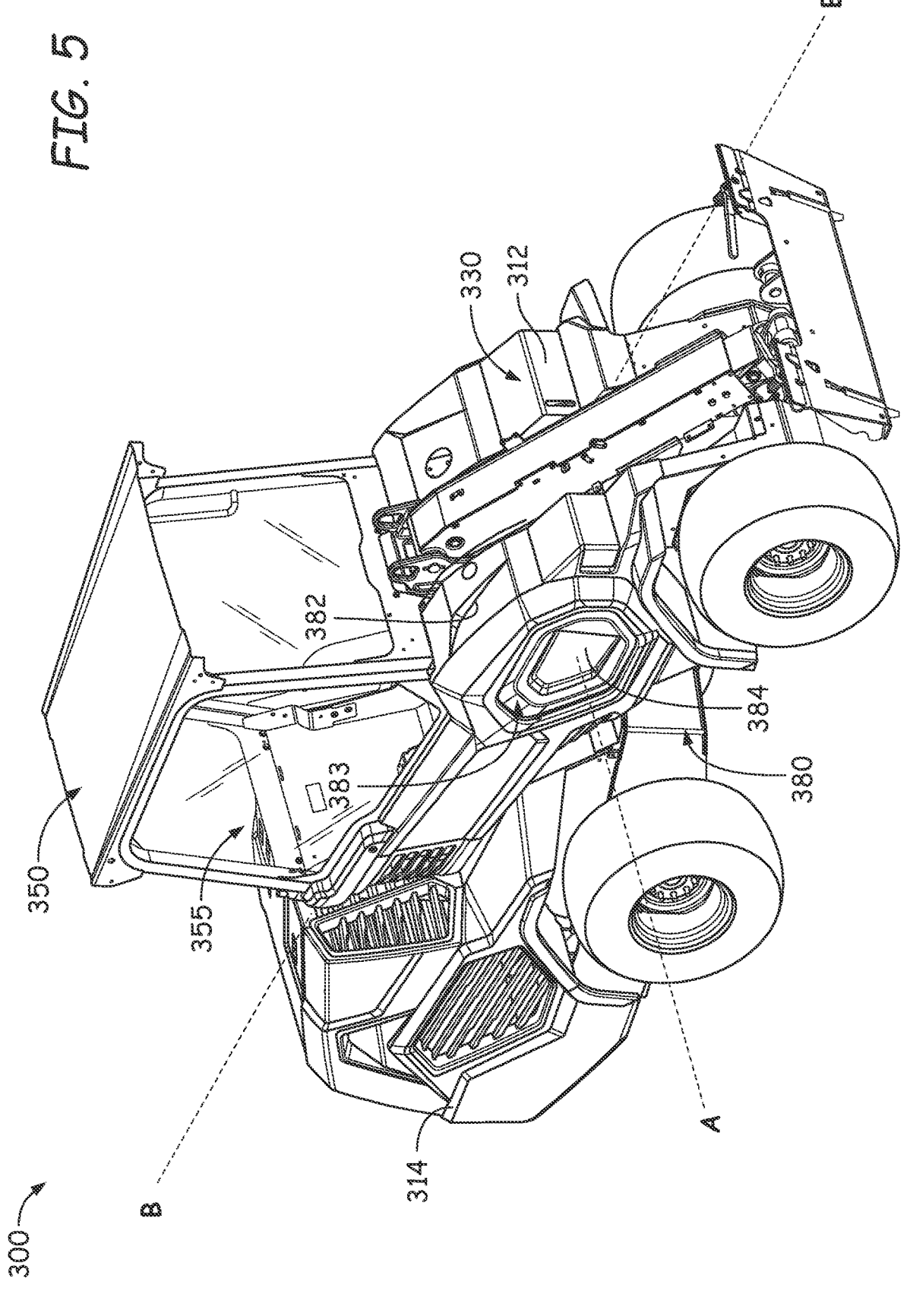
FIG. 5 is a perspective view showing generally a side of a power machine in the form of a small articulated loader.

FIG. 5 illustrates an articulated loader 300, that is generally similar to the articulated loader 200 described above and illustrated in FIGS. 2 and 3, and similar numbering as for the loader 200 is generally used to indicate similar features on the loader 300. For example, the articulated loader 300 has a front frame member 312, and a rear frame member 314 that can pivot relative to the front frame member about a vertical axis. In the illustrated example, the loader also includes a work element 330 configured as a lift arm assembly. The front frame member 312 supports a cab 350 with an operator station 355 enclosed by the cab 350 that is generally similar to the cab 250 and the operator station 255 described above.

According to some examples, the loader 300 can include a climate control system 383 for regulating temperature within the operator station 355, including an air-conditioning (A/C) system. Correspondingly, the climate control system can include a condenser 384, which can operate to reject heat from the climate control system (e.g., the A/C system included therein) by providing airflow across components of the climate control system in a direction away from the loader 300.

In some conventional climate control systems for loaders, a condenser for an A/C system may be located on a roof of an operator station, which can help with some packaging issues but can also result in undesired leaking of fluids into the operator station and height-clearance issues for the power machine as a whole. In other conventional loaders with climate control systems, a condenser can be positioned adjacent to a rear window of the operator station, in an arrangement that can address some packaging or other issues but can also impede a field of view of the operator while operating the loader.

In contrast to conventional systems, the condenser 384 illustrated in FIG. 5 is mounted on the front frame member 312 on a first lateral side 380 of the loader (e.g., a right side, as shown), at least partly forward of the operator station 355. Thus, the illustrated arrangement of the condenser can provide benefits over the conventionally positioned condensers, including by providing improved visibility for an operator and avoiding issues of condensation infiltrating the operator station 355 of the loader 300. Other configurations are possible, however. For example, the condenser 384 could be positioned on a different lateral side of the loader 300 (e.g., the left side, as shown), or could alternatively be positioned either partly or fully beneath the operator station 355.

Figure 6:
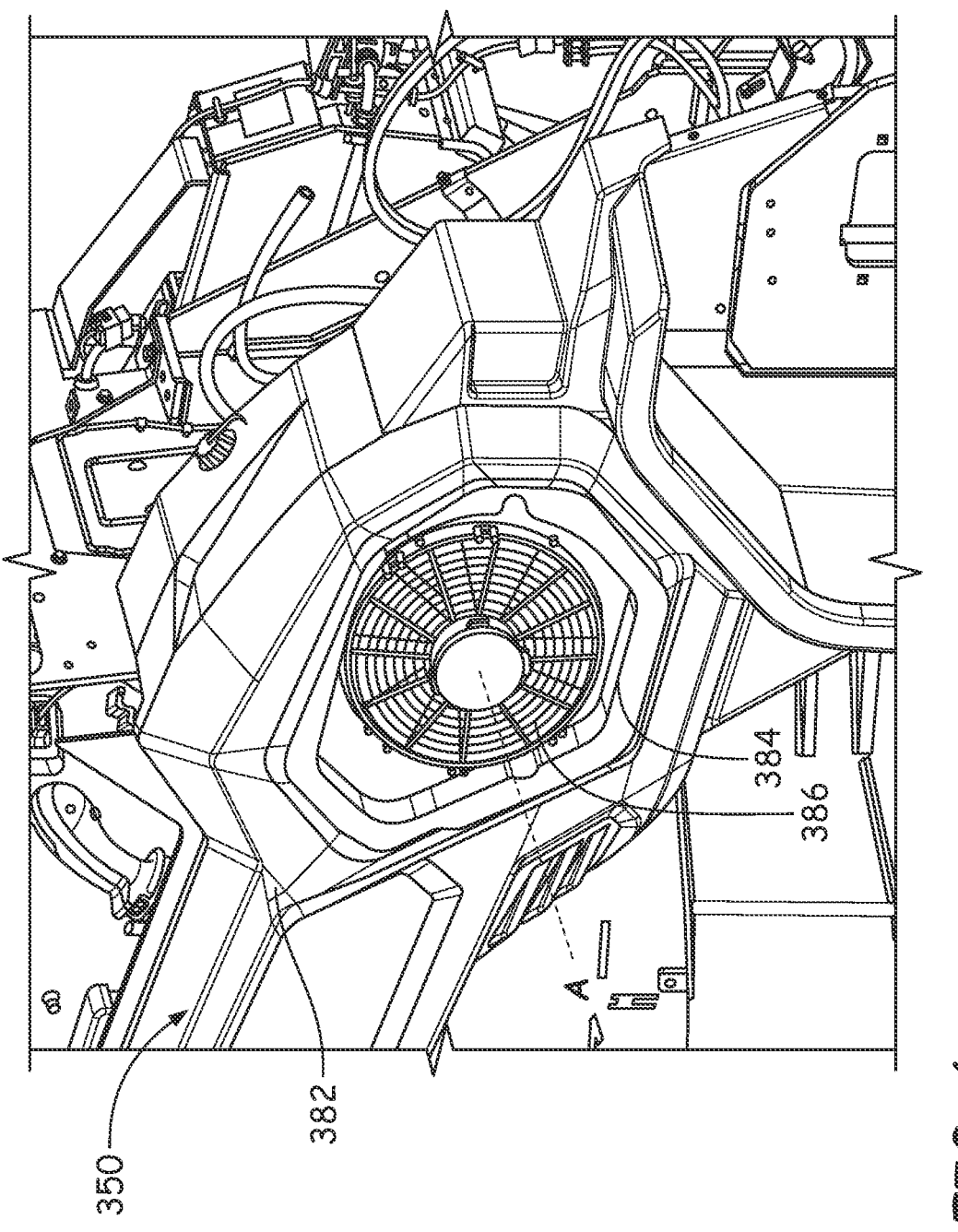
FIGS. 6 through 10 are perspective partial views of the power machine of FIG. 5, with certain respective components removed or shown transparently for clarity, illustrating a condenser mounted to a side of the power machine according to an example of the disclosure.

In some examples, a condenser for a climate control system of an articulated loader can utilize an axial fan to reject heat from the loader. FIG. 6 shows an example of the condenser 384 with an axial fan 386. As illustrated, the axial fan can rotate about an axis A, which can extend in a direction that is transverse to a front-to-back axis B of the loader 300 (i.e., as shown in FIG. 5) and laterally away from a lift arm (or other work group structure) of the loader 300. When rotating about axis A, the axial fan 386 can generate air flow in a direction that is generally along axis A, and away from the loader 300. This orientation can thus be beneficial in minimizing damage to the condenser 384 as can be caused by debris or objects that could fall from the work element 330, as well as in providing generally improved air flow patterns for heat rejection. For example, during operation of the loader 300, debris can fall from work element 330 and potentially accumulate on portions of the loader 300 that are beneath the work element 330. Because the condenser 384 and condenser fan 386 face in a transverse direction to the front-to-back axis of the loader 300 (e.g., in a direction parallel to axis A), any such debris from the work elements may tend not to land on the fan or otherwise impeded the associated cooling airflow.

In the illustrated example, a housing 382 is provided on the lateral side 380 of the loader 300, as can house the condenser 384 and other components of the loader (e.g., electrical components, mechanical components, or hydraulic components). In some examples, as further discussed below, the housing 382 can also help to protect components other than the condenser 384 or can help to guide air flow for combined cooling of the condenser and other components (e.g., hydraulic valves, flow lines, etc. for a hydraulic control system of the loader 300).

Figure 7:
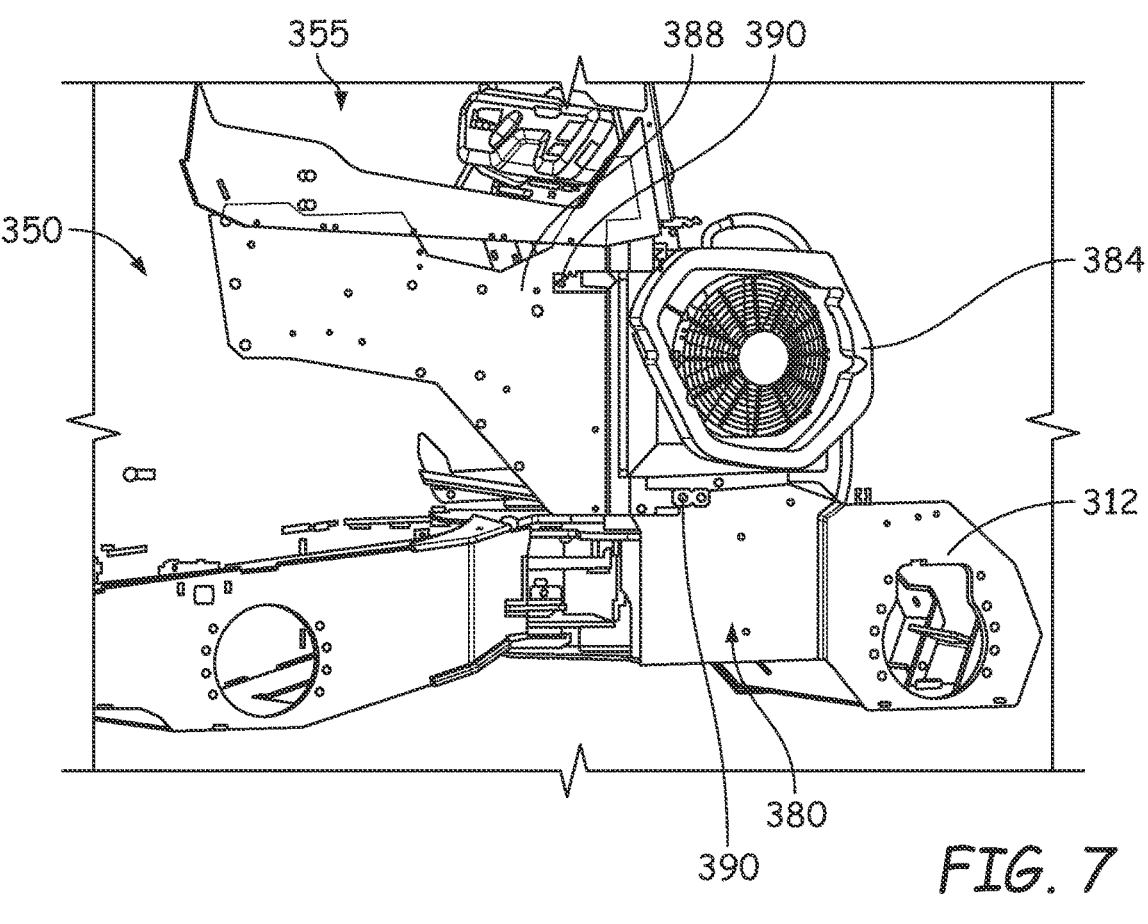
Figure 8:
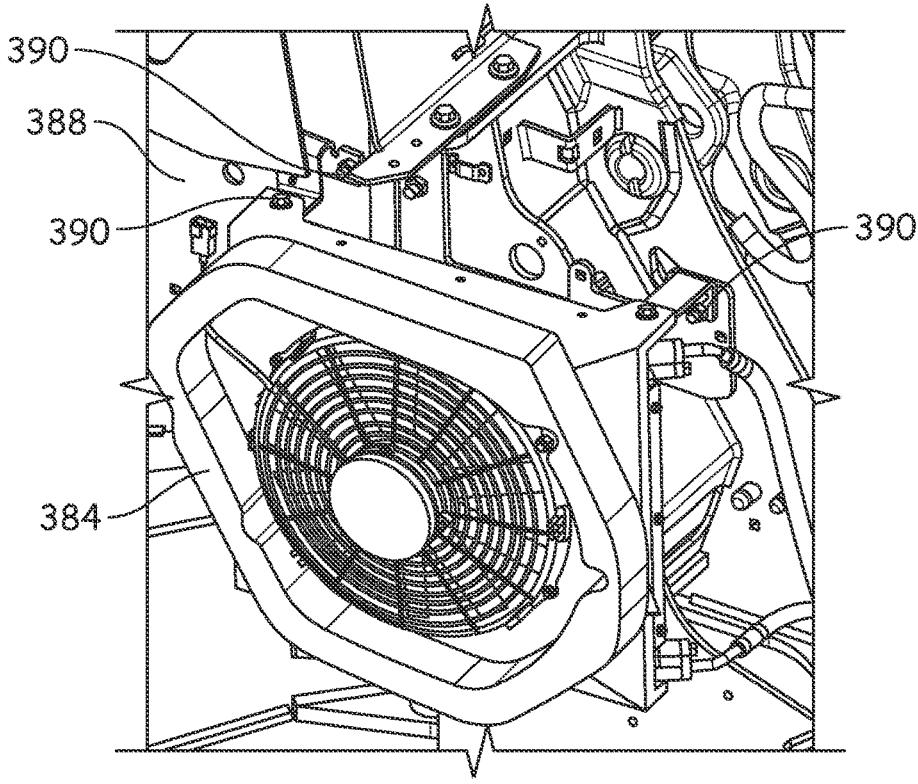

In some cases, it can be beneficial to mount a condenser directly onto a front frame member of a loader and, in particular, to mount the condenser to a structural side wall of a cab or other operator station of a loader. For example, as shown in FIGS. 7 and 8 in particular, the condenser 384 can be mounted onto a lateral side wall 388 of the cab 350 (e.g., using a plurality of fasteners 390, such as screws, pins, bolts, anchors, rivets, etc.), so as to be securely supported at a beneficial operational location (e.g., as detailed above). In some cases, the lateral side wall 388 can be a structural element of the cab 350, as can structurally define an enclosed area for the operator station 355 in combination with other structural elements or as can provide structural integrity for the cab 350 to protect an operator in the event of a roll-over of the loader (e.g., can be of sufficient stability to maintain integrity of the cab 350 under expected operational forces, including the weight of the loader).

In some examples, mounting the condenser 384 to a sufficiently strong structural component of the loader (e.g., the lateral side wall 388) can reduce the impact of the vibration produced by the condenser 384 on the loader 300 and its components, while also ensuring the condenser 384 is securely mounted. In some examples, additional elements may be added to the system to reduce the effects of vibration on the loader 300 or on the condenser 384. In some configurations, for example, rubber isolators (not shown) can be installed between the condenser 384 and the lateral side wall 388 (e.g., as part of one or more mounting brackets for the condenser 384) to reduce vibrational effects. Other configurations are possible however, including configurations with other elements for reducing vibration between the condenser 384 and the side wall 388.

Figure 9:
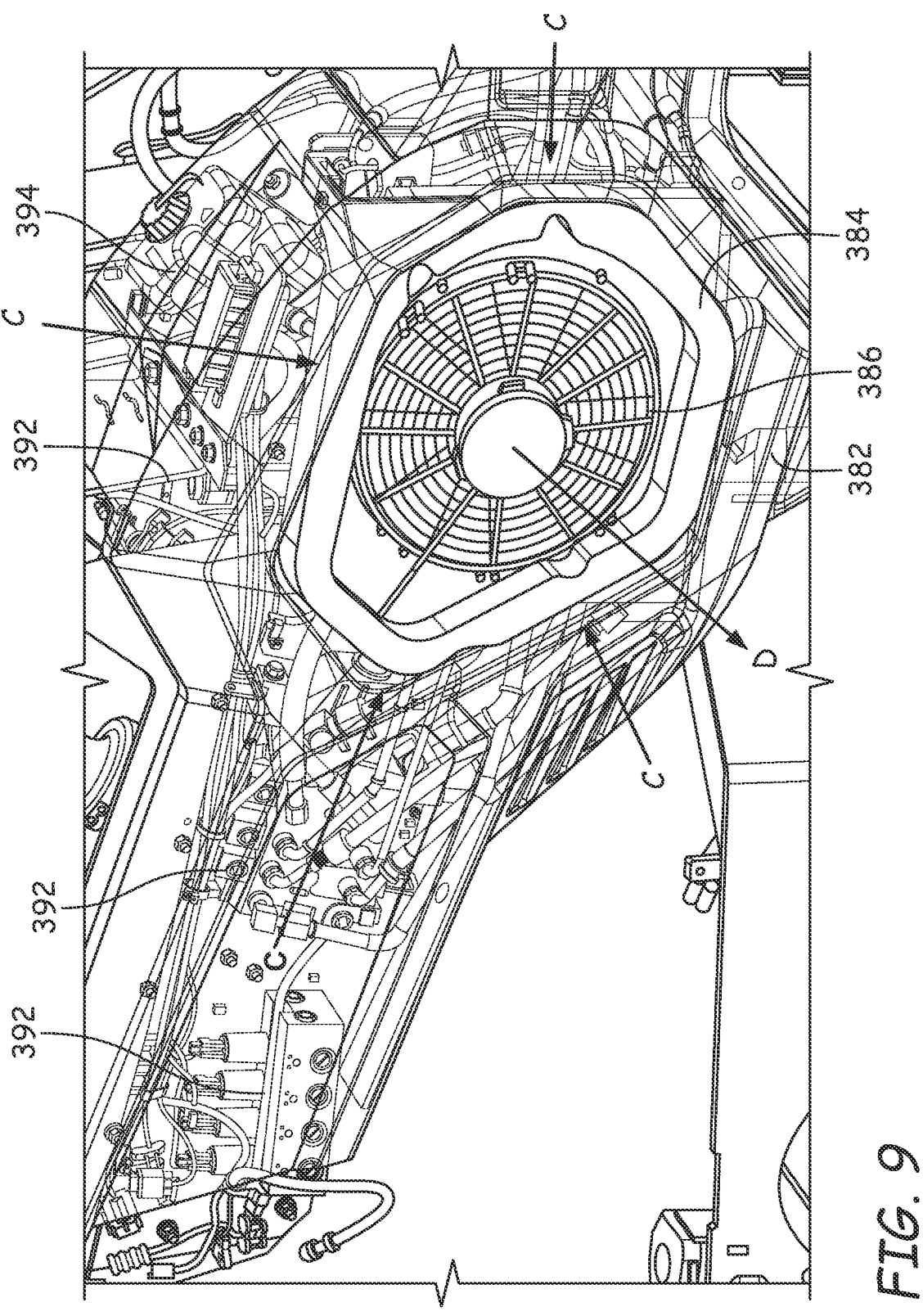

In some cases, a condenser for a climate control system can be positioned so that air flow for the condenser can provide additional cooling for other components of a loader. For example, as shown in FIG. 9, the housing 382 (shown as transparent in FIG. 9) can enclose additional components 392 of the loader 300, in addition to housing the condenser 384. As illustrated, for example, the additional enclosed components 392 can include electrical wiring, hydraulic elements, mechanical components, etc. When the condenser 384 is in operation, the rotation of the axial fan 386 draws air across the components 392 in a generally centripetal direction C relative to the fan 386, and then rejects the air in an axial direction D that is away from the loader 300 and generally parallel with the transverse axis A. Thus, for example, operation of the condenser 384 can cool the additional components 392 in addition to providing climate control for the operator station 355.

Figure 10:
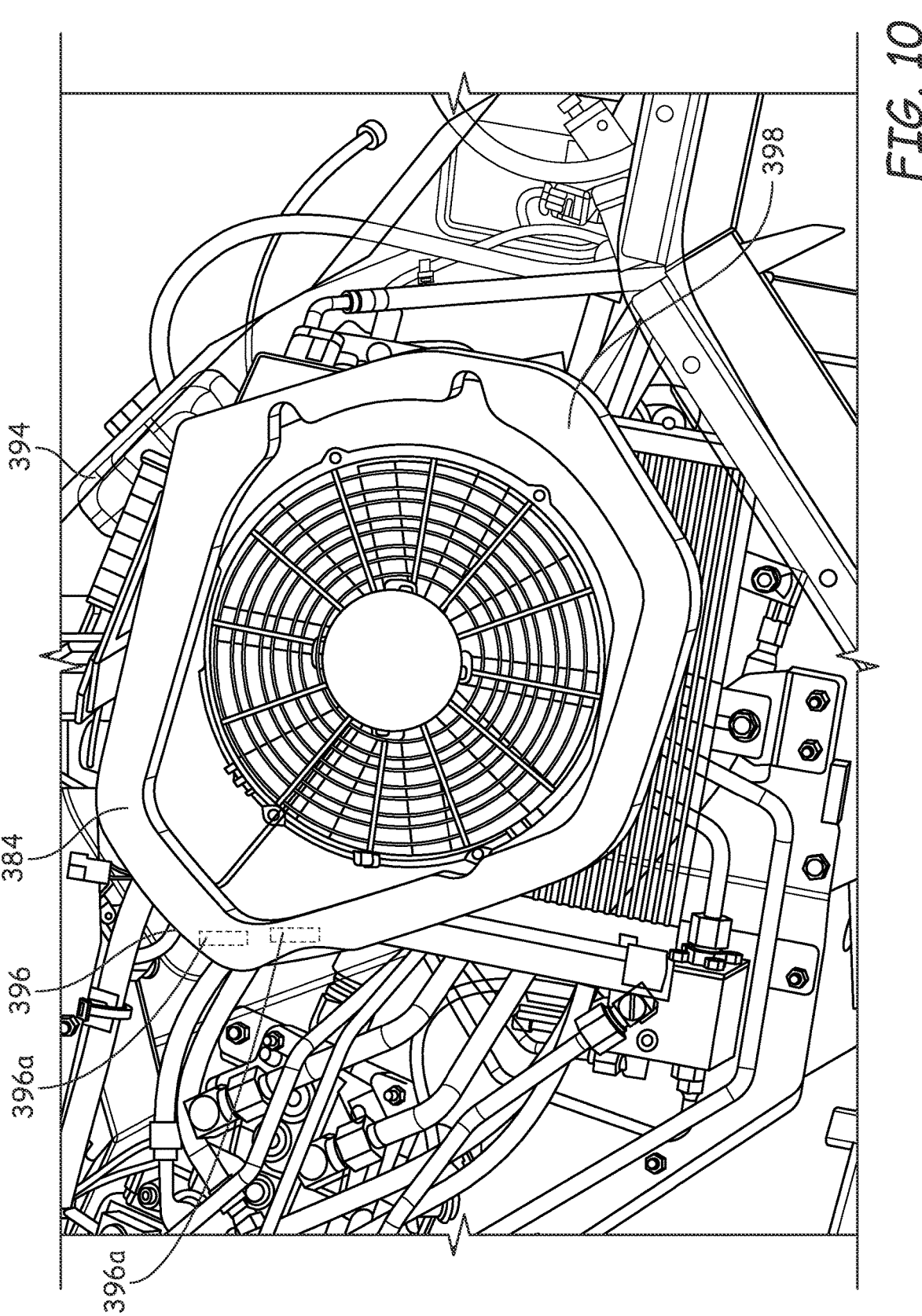

In some examples, a condenser can be hingedly mounted to a cab wall or other support structure, including in the beneficial orientation shown in FIGS. 5 through 10. In some cases the ability to rotate a condenser about a hinge can be useful in providing easier access to components that are behind the condenser, and can enable a worker to perform maintenance activities on those components without fully removing the condenser. As illustrated in FIGS. 9 and 10, for example, there can be various hydraulic and other components 394 behind the condenser 384 (e.g., toward an interior of the power machine 300 relative a worker on a lateral side of the loader).

In some examples, hinges 396a (see FIG. 10) can be provided on a first side 396 of the condenser 384, so that the condenser can rotate about a hinge axis to provide access to the components 394 (e.g., a vertical hinge axis parallel to the vertical axis about which the rear frame member can articulate relative to the front frame member). To rotate the condenser 384, for example, mounting fasteners (e.g., at least one of the plurality of fasteners 390) can be removed from a second side 398 of the condenser (see FIG. 10), thereby uncoupling the second side 398 from the lateral side wall 388, and allowing rotation of the condenser 384 about the hinge(s). When the condenser is rotated relative to its installed position, a worker facing the lateral side 380 of the power machine 300 has direct access to components 394, enabling easier maintenance of those components. Among other benefits, rotation of the condenser 384 can also provide greater access to mechanical and hydraulic components of work element 330 (see FIG. 5) for simpler servicing thereof. Further, in some cases, similarly improved access for maintenance can be similarly provided due to the easy accessibility of the condenser 384 and associated mounting fasteners, including as facilitated by the forward, laterally exterior positioning of the condenser 384 as a whole.

In some cases, hinges can be located on or provided by support brackets for the condenser 384. For example, as shown in FIG. 8, support brackets and fasteners to secure the condenser 384 to the plate of the side wall 388 can provide vertical hinge axes to pivot the condenser 384 outward. This arrangement can provide strong structural support while also allow the condenser 384 to be easily pivoted laterally outwardly, after an operator has removed bolts on an opposing side to release the condenser 384 from corresponding brackets or other support structures.

As described above, the rear frame member of a power machine (e.g., similar to the loaders 200, 300) can support power systems for powering elements of the power machine (e.g., internal combustion engines, power conversion systems, hydrostatic pumps, fuel tanks etc.). When the power machine is in operation, the power system generates heat, and must generally be cooled to prevent overheating, excessive inefficiencies, or other problems that can be caused by excessive heat in a system. Generally, power machines can be arranged to enclose power sources and related components in non-sealed internal areas (e.g., dedicated engine compartments) and can then route ambient air into and out of the internal areas to provide cooling.

Figure 11:
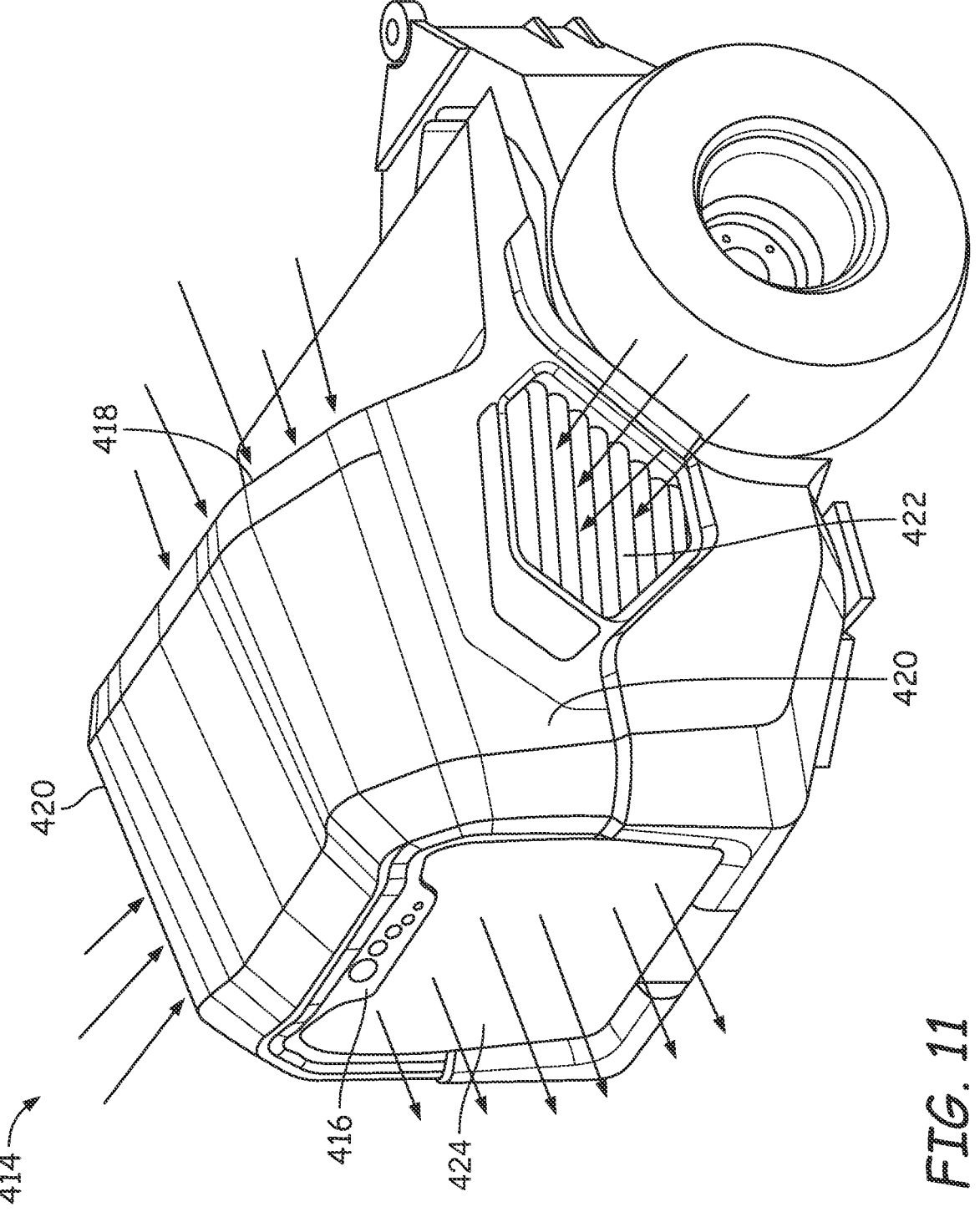
FIG. 11 is a perspective and schematic partial view showing generally a rear portion of the power machine of FIG. 5 according to an example of the disclosure.

In some examples, improved structures can be provided for cooling of power machines according to this disclosure, particularly for articulated loaders, which may include power sources supported within an internal area on a rear frame member. For example, FIG. 11 illustrates a configuration of a rear of a power machine, including a rear frame 414, that can provide improved air flow to cool a power source and related systems supported on the rear frame 414. In the illustrated example, the rear frame member has a back side 416, a front side 418, and lateral sides 420. The front side 418 and lateral sides 420, for example, can have louvers 422 to allow relatively cool air to flow into an interior space (not shown) of the rear frame 414 and thereby cool a power source (not shown in FIG. 11) and related components. Inside the interior space of the rear frame 414, heat generated by relevant systems can heat the air, and the heated air can be expelled from the system (e.g., through a vent 424 on the back side 416 of the rear frame 414).

In some examples, certain structures within an interior space (or others) can be configured to provide improved air flow for cooling. For example, a fluid holding tank for a power machine can include air flow passages that can be aligned with one or more vents to provide increased flow area, more direct flow paths, or otherwise improve cooling performance.

In some examples, it can be advantageous for a fluid holding tank to be positioned on a periphery of a power system relative to other components of the system. An arrangement with a fuel tank at a periphery can, for example, improve accessibility for refueling which also allowing other components to be located closer to each other. This can improve the overall packaging efficiency, and reduce the need to route long fluid or other connections between the components. In some examples, including as shown for articulated loaders, the fuel tank or other fluid holding tank can be positioned adjacent to one of the louvers through which cool air is brought into the system. With conventional tank designs, however, air must therefore flow around the fluid holding tank before reaching the components requiring cooling, introducing inefficiency in the cooling process.

Some examples of the disclosed technology can provide increased cooling capacity and efficiency over conventional systems by providing a direct flow path for cool air to flow into the system (i.e., as opposed to arrangements where air flows around a periphery of a fuel tank). In some examples, channels can be provided through a fuel tank (or other fluid holding tanks, such as a hydraulic tank. For the purposes of brevity, the following discussion will focus on a fuel tank) so that air can flow directly through the channels to reach an engine compartment of the power system. However, similar arrangements can provide improved air flow for various combinations of tanks and cooling systems.

Figure 12:
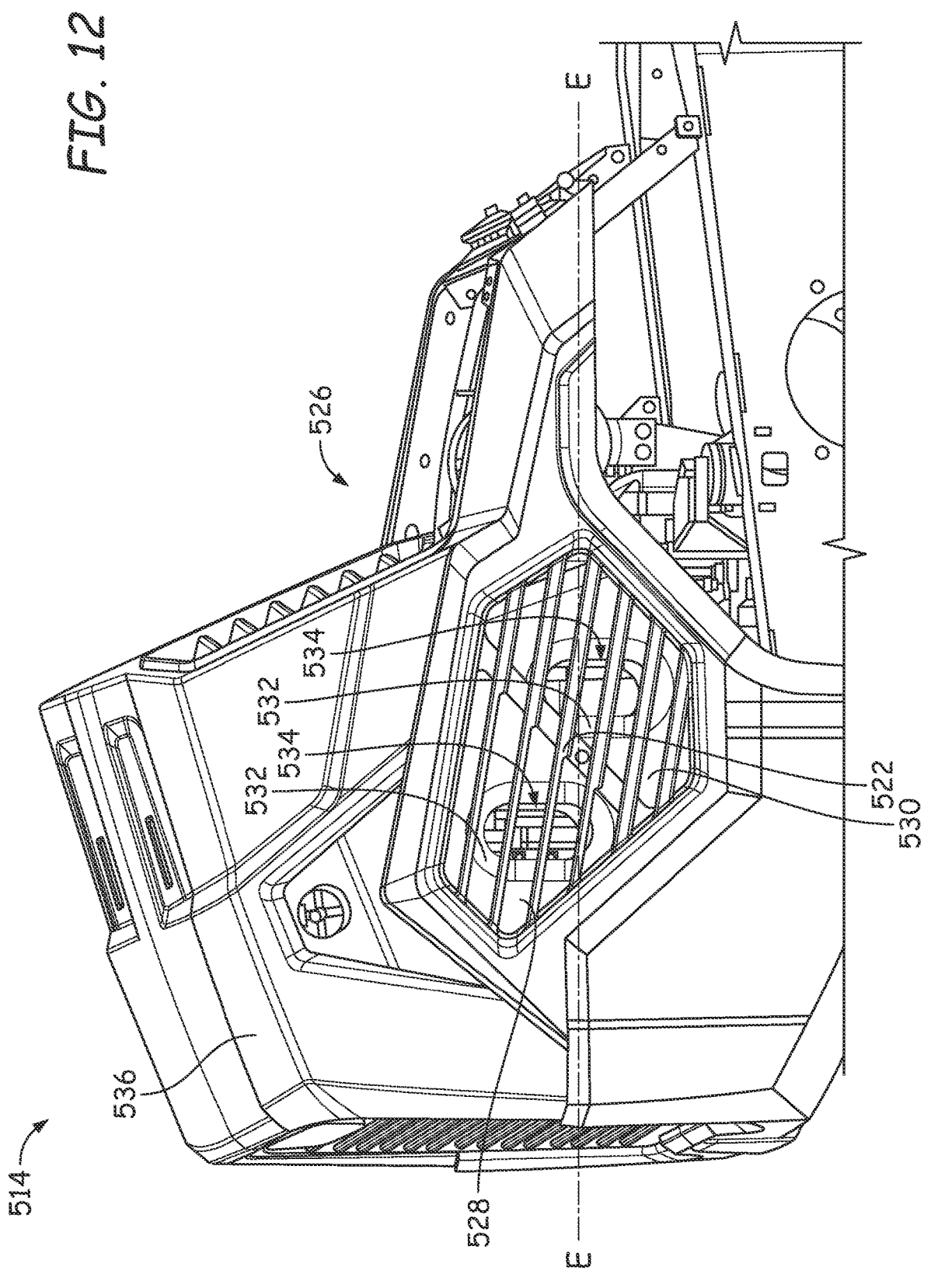
Figure 13:
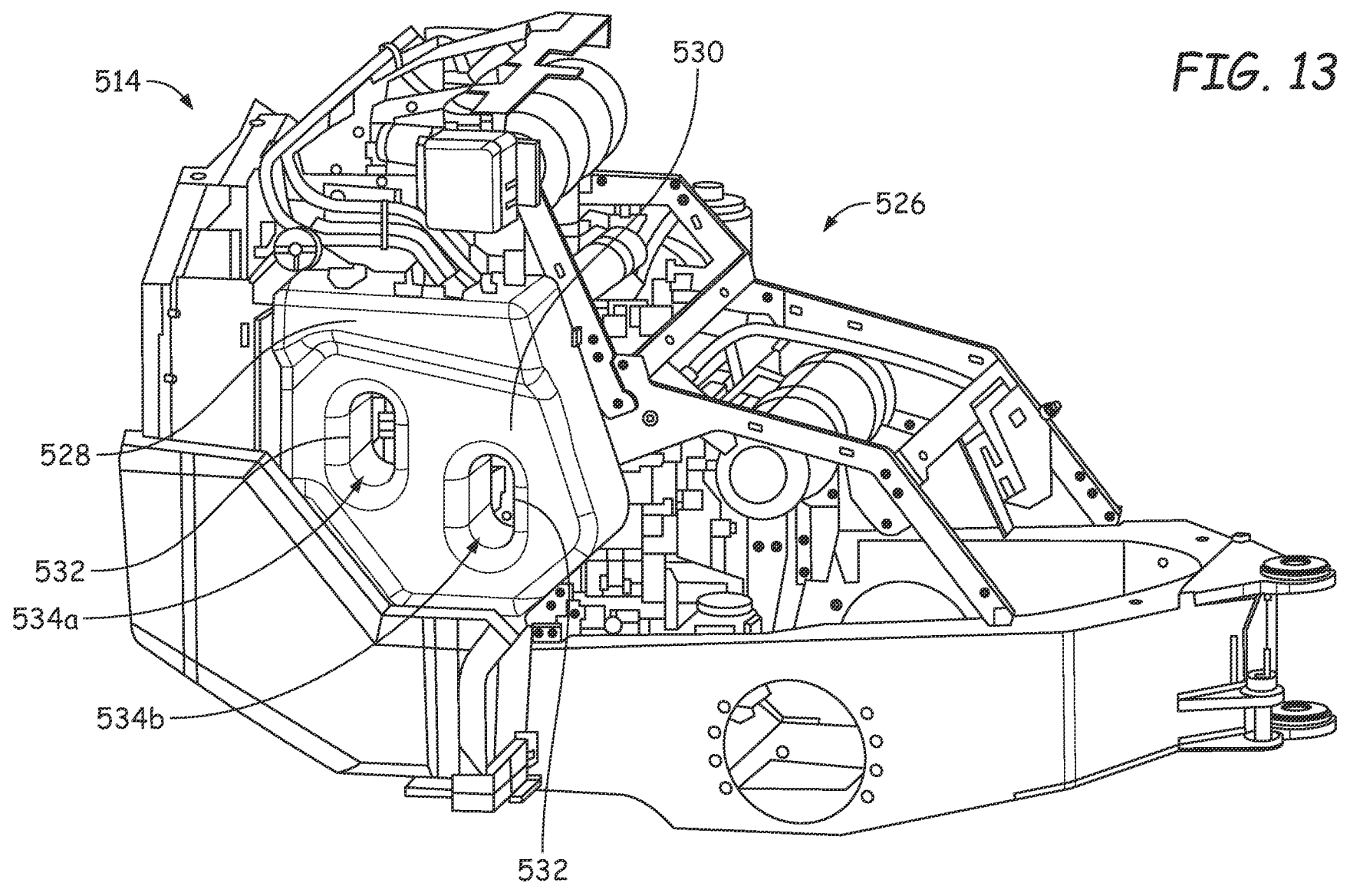

As one example, FIG. 12 illustrates a rear frame 514, which is similar to rear frame 414 and is labeled with similar numbering for similar components. Thus, for example, the rear frame 514 has a vent with a louver 522, which can allow cool air to flow into an internal area 526 (e.g., an engine compartment as shown in FIG. 13). A fuel tank 528 is arranged in the internal area 526, with a laterally exterior face 530 of an outer shell of the fuel tank 528 adjacent to the louver 522 (e.g., so that part of the fuel tank 528 is arranged along a straight-line path between the louver 522 and the internal area 526 or a particular component therein). Further, the shell of the fuel tank 528 has external walls 532, each of which define an airflow passage 534 configured to route air flow through the louver 522 so that a larger quantity of cooler air is made available to feed into heat exchangers and provide an air wash for the engine located in the internal area 526. In particular, in the illustrated example, the airflow passages 534 extend the entire width of the fuel tank 528, from the exterior face 530 to a laterally interior face 531 (shown in FIG. 16) of the fuel tank 528.

As shown, the airflow passages 534 can be spaced apart from each other in a direction parallel to a front-to-back direction E of the rear frame 514. Other configurations are possible, however, and a fuel tank (e.g., similar to fuel tank 528) can alternatively include only one airflow passage, or more than two airflow passages. Further, although the passages 534 are shown as being fully enclosed by the shell of the fuel tank 528 (i.e., laterally, relative to a cooling flow direction through the passages 534), some examples can include passages that are partially open along one or more lateral directions (also relative to the cooling flow direction).

In some examples, the illustrated arrangement of the airflow passages 534 on the fuel tank 528 can provide particular improvements in air flow for cooling the internal area 526. As illustrated in FIG. 12, for example, the inlet profiles of the airflow passages 534 (e.g., as taken as a cross-sectional profile of the relevant passage 534 in a direction transverse to the airflow through the louver 522) and the opening of the louver 522 fully overlap, so that no cross-sectional area of the airflow passages 534 is blocked by a housing 536 of the rear frame 514.

As another example, as shown in FIG. 13 with the housing 536 and the louver 522 removed for clarity, a first of the airflow passages 534a is offset from a second of the airflow passages 534b in a vertical direction (i.e., airflow passage 534a is higher relative to a ground beneath rear frame 514 than is airflow passage 534b). The offset of passage 534a relative to passage 534b enables the airflow passages 534a, 534b to fully align with the louver 522, as shown in FIG. 12, and can thus produce improved cooling of the components within the internal area 526. Other configurations, however, are possible. For example, a front airflow passage (e.g., similar to the passage 534b) could be differently offset from a rear airflow passage (e.g., similar to the passage 534b) to accommodate louvers or vents of different configurations.

Figure 14:
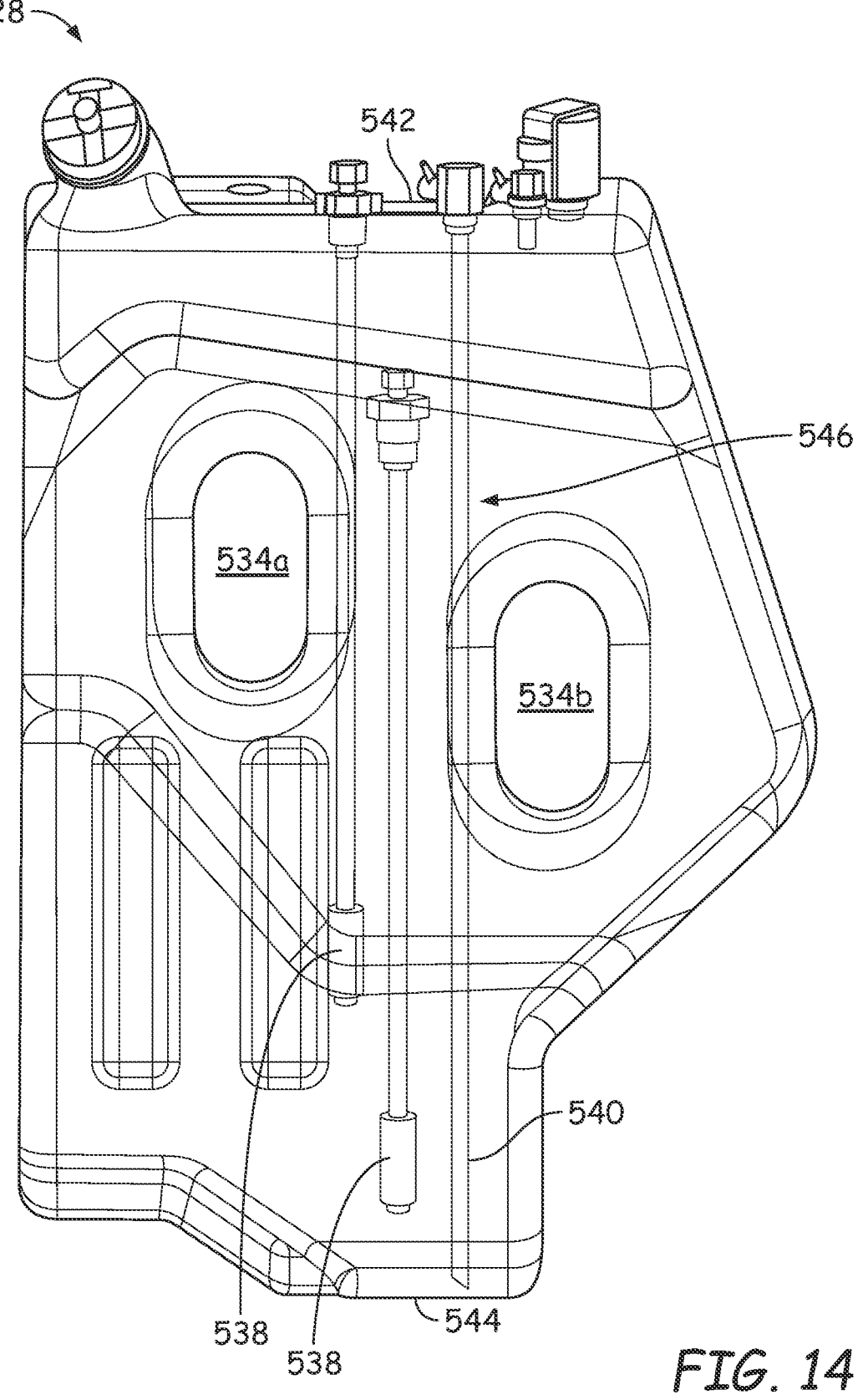
FIG. 14 is a perspective view of a fuel tank of the power machine as configured in FIG. 11 through 13, showing generally a lateral side of the fuel tank.

In some examples, configuration of a fuel tank can provide improved air flow for cooling while also ensuring efficient monitoring and delivery of fuel to a power source. For example, multiple airflow passages in a fuel tank can be arranged to accommodate fuel pickups or sensors that can extend into the fuel tank at a range of depths. As shown in FIG. 14, for example, fuel level sensors 538 and a fuel pickup 540 can extend into an internal volume of the fuel tank 528. In some cases, it can be beneficial for components such as the pickup 540 and the fuel level sensors 538 to extend from a top 542 of the fuel tank 528 to a bottom 544 of the fuel tank 528, or to some distance that is less than the full distance from the top 542 to the bottom 544 of the fuel tank 528. Accordingly, the airflow passages 534a, 534b can be spaced apart from each other in a horizontal direction, which can be parallel to the front-to-back direction E (see, e.g., FIG. 12) of the rear frame 514. Thus, for example, the fuel tank 528, as illustrated in FIG. 14, has an internal vertical volume 546 that extends uninterrupted from the top 542 to the bottom 544 of the fuel tank 538, and a portion of the internal vertical volume 546 is disposed between the airflow passages 534a, 534b. As illustrated, therefore, the pickup 540 and fuel level sensors 538 can extend into the internal vertical volume 546 to a depth up to and including the full distance between the top 542 and the bottom 544 of the fuel tank 528. Other configurations are possible, however, and an internal vertical volume can be disposed between more than two airflow passages or can alternatively extend between a peripheral wall of a fuel tank and a single (or multiple) airflow passage(s).

Figures 15, 16:
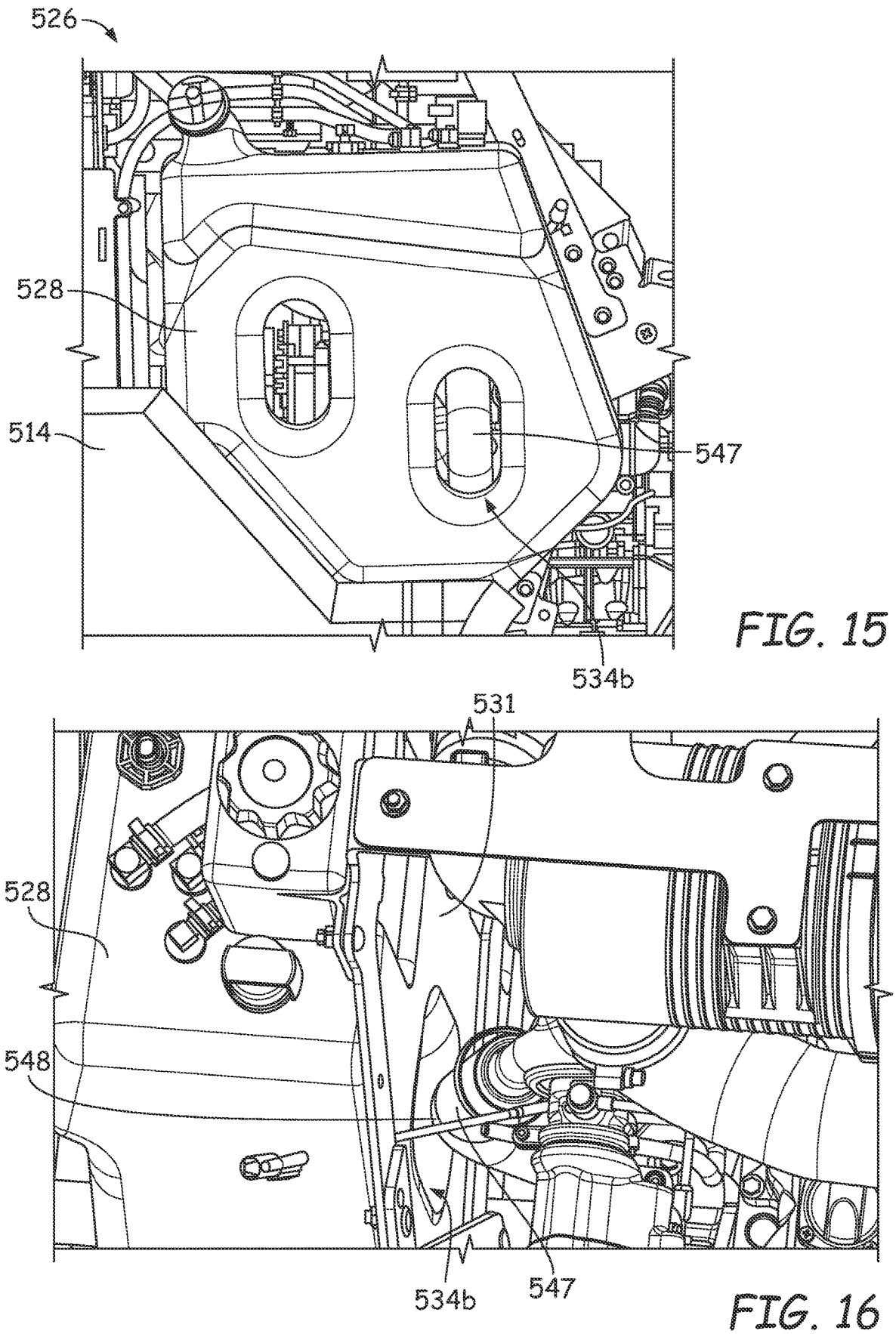
FIGS. 15 and 16 are perspective partial views of the rear portion of the power machine as configured in FIG. 11, with certain components removed for clarity, illustrating an installed configuration of the fuel tank relative to an engine compartment.

Passages in a fuel tank (e.g., similar to the passages 534 of fuel tank 528) can further benefit a power machine by effectively providing more volume in an internal area of a rear frame member for accommodating power system (or other) components. As shown on FIGS. 15 and 16, for example, the fuel tank 528 is mounted to the rear frame 514 in the internal area 526 of the rear frame 514. In the illustrated example, the airflow passage 534b is aligned in the front-to-back and top-to-bottom directions with a piping element 547. As illustrated in FIG. 16 in particular, the piping element 547 can thus be at least partially nested in the airflow passage 534b (i.e., can extend by some amount into the airflow passage 534b), such that an edge 548 of the piping element is disposed between the interior face 531 and the exterior face 530 (not shown) of the fuel tank 528. Thus, for example, without substantially impeding cooling air flow, the piping element 547 (e.g., part of a turbocharger) can extend into space that would otherwise have been occupied by a solid fuel tank. Other configurations are possible, however, and different components of the power system can extend into one or more airflow passages of the fuel tank (e.g., portions of the engine, hydrostatic pumps, power conversion components, etc.), including one or more different airflow passages than are shown in FIGS. 15 and 16.

In some cases, power machines similar to the articulated loader 200, 300 described above can include primary braking systems and secondary braking systems. A primary braking system can be powered, for example, using hydraulic pressure from a primary power source (e.g., a charge pump), and a secondary braking system can be powered using a secondary power source (e.g., a spring that biases a brake into an engaged position). This arrangement, for example, can provide braking of a power machine even when a primary braking system is not operable (e.g., when a first primary power source has entered a failure state). In conventional systems, however, an operator may not be able to modulate braking power of the secondary braking system. Accordingly, for example, when the secondary braking system is engaged, a power machine may come to a stop in an un-modulated manner (e.g., faster than may be comfortable or desirable for an operator).

Figure 17A:
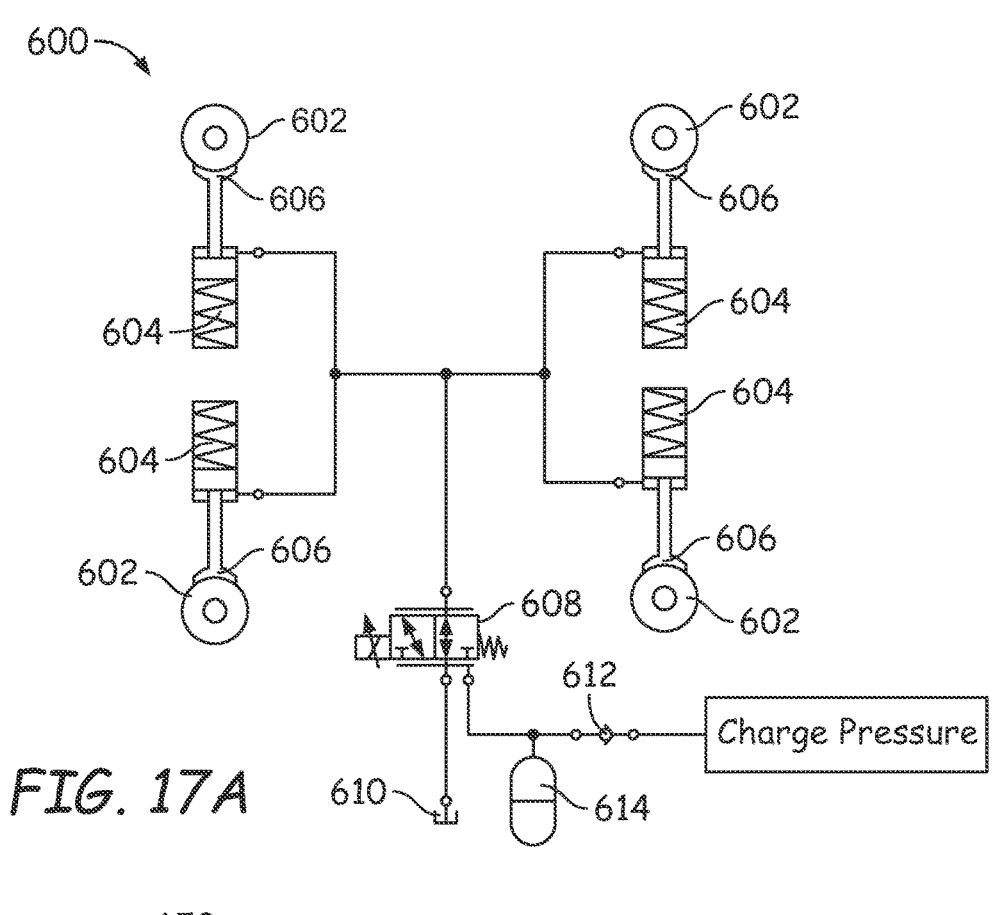
FIGS. 17A and 17B are schematic diagrams illustrating aspects of a modulated braking system for a power machine, according to an example of the disclosure.

Some examples disclosed herein can advantageously allow modulation of the secondary braking system, thus potentially allowing an operator to control a rate at which a power machine is slowed during operation of the secondary braking system. For example, FIG. 17A illustrates an example secondary braking system 600 for a power machine, according to some examples of the disclosed technology for secondary braking of tractive elements 602 (e.g., similar to the tractive elements 140 of power machine 100). In the illustrated example, the tractive elements 602 comprise wheels. However, other configurations are possible, and a secondary braking system 600 can be used for other types of tractive elements for power machines. As shown, springs 604 can bias a brake 606 toward the tractive elements 602, providing maximum braking torque in the absence of pressure in the system.

Still referring to FIG. 17A, a brake control valve 608 and an accumulator 614 are in fluid communication with a source of charge pressure (e.g., a charge pump (not shown)), downstream of a check valve 612 relative to the source of charge pressure. Thus, for example, a charge pump (not shown) can provide charge pressure to the braking system 600 under normal operating conditions.

In the illustrated example, the brake control valve 608 is a spool valve with two spool positions, operable based on electronic control signals from an operator input device (or other control device) of the power machine. In particular, when a spool of the brake control valve 608 is in a first spool position (e.g., the left position shown in FIG. 17A), the charge pressure from the hydraulic pump is routed to the brakes 606 to oppose (e.g., overcome) the force of the springs 604 that bias the brakes 606 toward the tractive elements 602. Thus, when the brake control valve 608 enables fluid communication between the hydraulic pump and the brakes 606, the pressure provided can disengage the brakes 606 to allow movement of the tractive elements 602, and hence, of the power machine. In some examples, when the primary power source (e.g., the hydraulic pump) is available, the spool of the brake control valve 608 can default to the first spool position, in which the brakes 606 are disengaged. For example, as shown in FIG. 17A, the valve 608 can be a default-on solenoid-operated valve that will be maintained in the first spool position so long as an electronic signal is received at the valve 608 (e.g., as corresponds to continued power delivery to the charge pump). When the electronic signal is removed, including due to system power loss, the valve 608 can then move under spring bias toward a second position (e.g., the right position shown in FIG. 17A), in which charge pressure is no longer routed by the valve 608 to the brakes 606 and pressure can instead be drained from the brakes 606 to a tank 610.

As also noted above, the secondary braking system can include the check valve 612 downstream of the hydraulic pump, and the hydraulic accumulator 614 downstream of the check valve 612 and upstream of the brake control valve 608. Thus, when the charge pump is in operation, flow from the charge pump across the check valve 612 can charge the hydraulic accumulator 614 up to a charge pressure. Further, when the hydraulic pump is in a failure state, or is otherwise unable to provide charge pressure to the braking system, the check valve 612 blocks flow out of the hydraulic accumulator 614, except through the valve 608, thereby preventing unwanted pressure leakage from the accumulator 614, and allowing the hydraulic accumulator 614 to operate as a secondary power source for the secondary braking system 600.

Correspondingly, when the primary power source (e.g. the hydraulic pump) is unavailable, the power machine can be switched from operating with the primary braking system to operating with the secondary braking system 600, with the hydraulic accumulator 614 as a power source. In particular, when the power machine switches from the primary braking system to the secondary braking system 600 (e.g., when the hydraulic pump is not able to provide pressure to the system), the spool of the brake control valve 608 can move by default to the second spool position, wherein drainage of pressure to tank can ensure that the brakes 606 are applied in the absence of operator input (and power from the primary power source). Further, the operator can provide a signal to the brake control valve 608 to selectively (e.g., proportionally) move the spool to the first position, so that the brakes 606 are placed in fluid communication with the hydraulic accumulator 614. Thus, via control of the control valve 608, when the power machine is using the secondary braking system, the operator can use the stored pressure from the accumulator 614 to selectively disengage the brakes 606 and thereby control the power machine to come to a more gradual stop than if the brakes 606 were applied with no modulation.

Figure 17B:
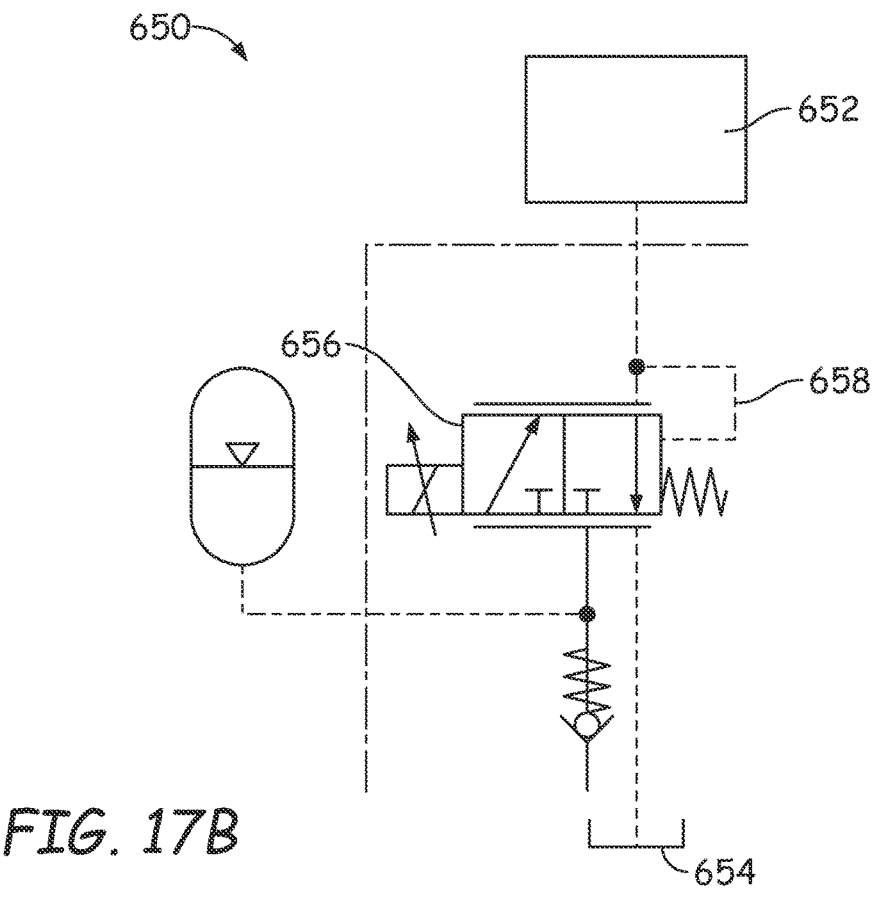

In the illustrated example, the flow path for the primary braking system and the secondary braking system 600 are substantially the same between the common source of charge pressure and the brakes 606. Further, both braking systems can share components, such as, for example, the brake control valve 608. However, in other examples, the primary braking system and the secondary braking system 600 can have separate flow paths, and separate brake control valves. Likewise, in some examples, other flow components or flow paths can be provided. For example, FIG. 17B shows an example configuration of another secondary braking system 650, which can operate similarly to secondary braking system 600. In this example, however, pressure drainage from brakes 652 to a hydraulic reservoir 654 is achieved using a spool valve 656 with a pilot-assisted drainage path (see pilot line 658) from the brake 652 to the reservoir 654.

Figure 18:
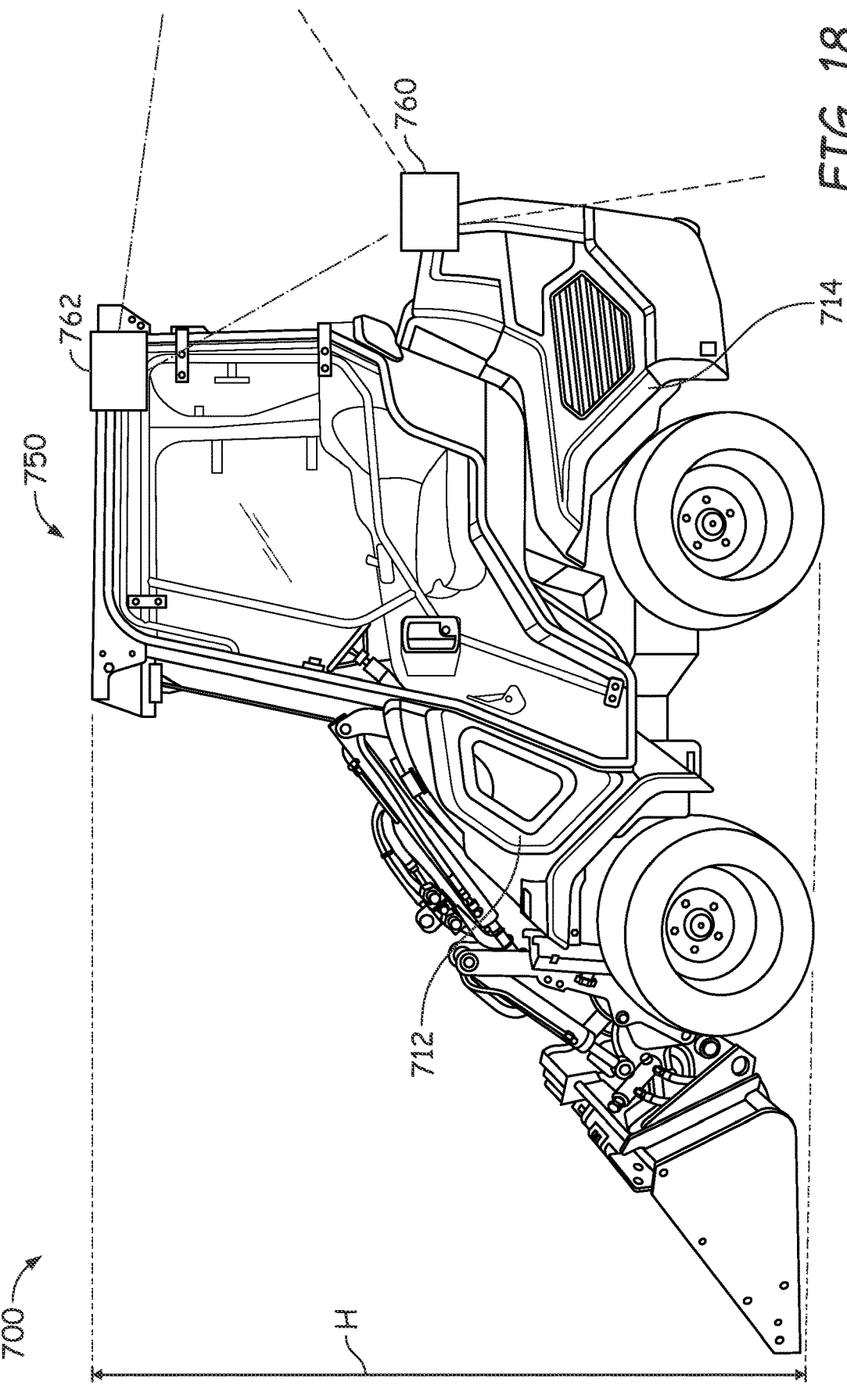
FIG. 18 is a perspective view showing generally a lateral side of power machine in the form of an articulated loader, including perspective and schematic representation of aspects a rearview vision system according to an example of the disclosure.

In some examples, an articulated loader can include a rearview vision system, having a camera providing a rearward view to assist an operator in backing up the loader. FIG. 18 illustrates an articulated loader 700 (e.g., similar to articulated loaders 200 and 300), having a front frame member 712, and a rear frame member 714 pivotally coupled to the front frame member 712 about a vertical axis. The front frame member supports an operator station 750 and the loader 700 has a total height H which, as illustrated, is the distance from a flat ground surface to a top of the operator station 750. FIG. 18 further illustrates mounting locations 760, 762 for a camera of a rearview vision system of the loader 700.

Some rearview vision systems for a loader provide a camera mounted to a rear frame member (e.g., similar to rear frame member 714), including as illustrated by the mounting location 760 on FIG. 18. However, in some examples, rearview vision systems for a loader can be improved over conventional arrangements by mounting a camera for a rearview vision system on a front frame member (e.g., on an operator station supported by a front frame member). In this regard, the mounting location 762 can be beneficially located at or near the top of operator station 750 (e.g., at or near height H at the top of the power machine cab structure). In some examples, the mounting location 762 can be located within a distance from the top of the operator station that is 20% or less of a total height H of the loader 700 (e.g., as measured at an aperture, a lens assembly, or an imaging sensor of the relevant camera). In some examples, the mounting location 762 can be located within a distance from the top of the operator station that is 15%, 10%, 5% or less of a total height H of the loader 700.

As shown in FIG. 18, the mounting location 762 is disposed above the rear frame member 714, although supported on the front frame member 712. A camera for a rearview vision system that is mounted at location 762 can therefore provide a field of view that includes at least a portion of the rear frame member 714, and can advantageously show the relative movement between the front and rear frame members 712, 714. Moreover, the field of view of a camera mounted at location 762 can further provide a more direct view of the ground immediately behind the loader 700 than can cameras mounted at some other locations.

Figure 19:
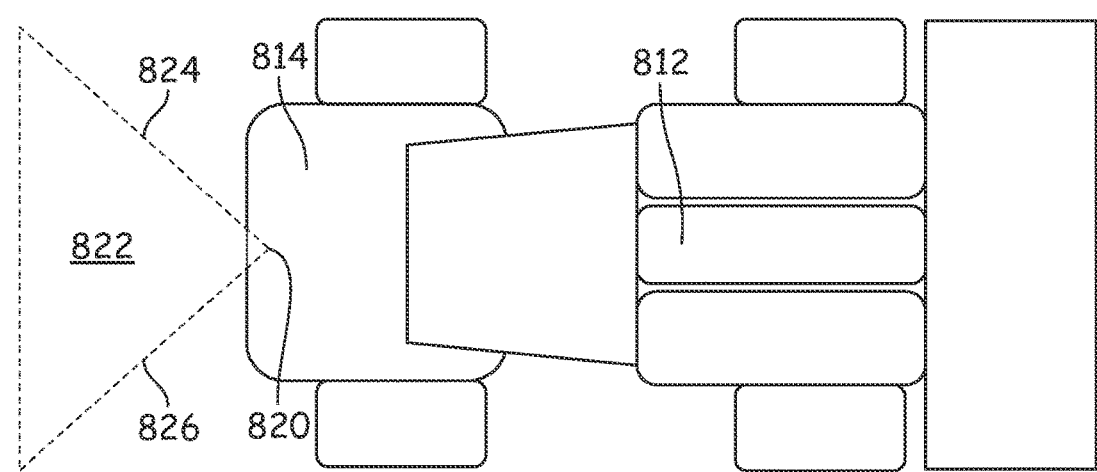
FIGS. 19 and 20 are schematic diagrams illustrating aspects of certain rearview vision systems for a power machine with an articulating frame.
Figure 20:
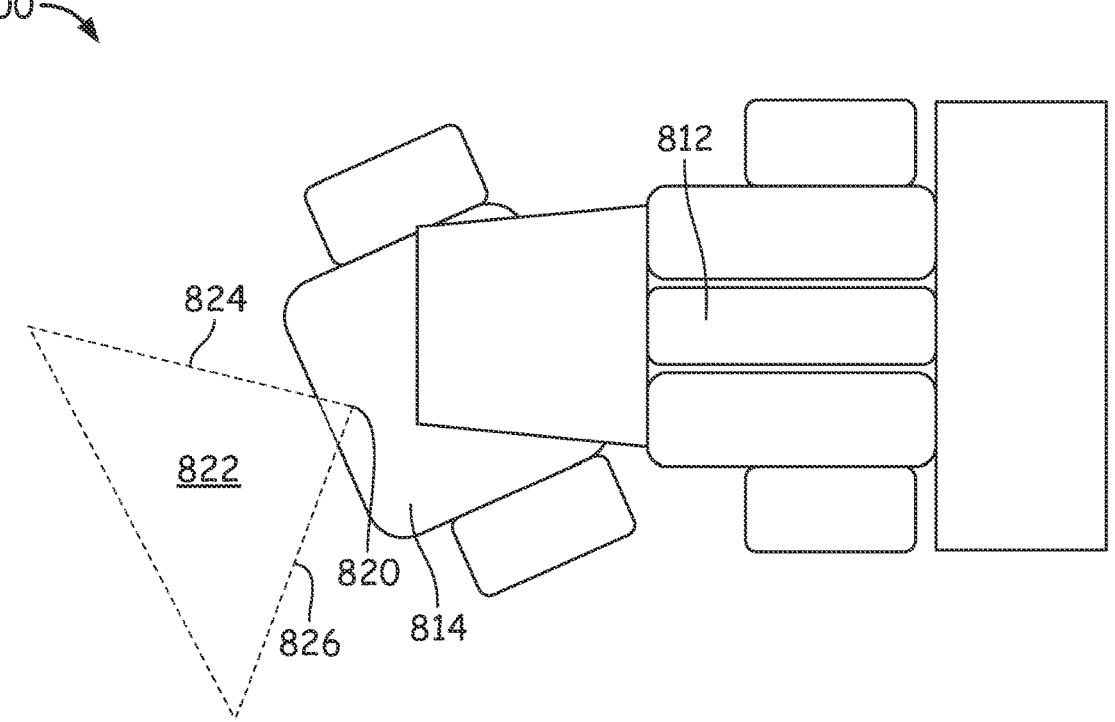

FIGS. 19 and 20 illustrate a loader 800 with a conventional rearview vision system. In particular, a camera 820 of the rearview vision system is mounted on a rear frame member 814 of the loader 800 (e.g., at a location on the rear frame member 814 similar to location 760 on rear frame member 714 of loader 700). The camera 820 thus has a field of view 822 that provides a view behind the rear frame member 814, spanning a width between a first edge 824 and a second edge 826 of the field of view 822. In FIG. 19, the rear member 814 is at a neutral orientation for straight travel (e.g., the rear frame member 814 is not pivoted with respect to a front frame member 812). FIG. 20 illustrates loader 800 with the rear frame member 814 articulatable with respect to front frame member 812. As shown, because mounted to the rear frame member 814, the camera 820 moves with rear frame member 814, and thus, the field of view 822 also shifts, providing a view directly behind the rear frame member 814. Correspondingly, although the field of view 822 can allow an operator to view obstacles or terrain behind the loader 800, the field of view 822 cannot directly capture the relative movement of the rear frame member 814 relative to the front frame member 812.

Figure 21:
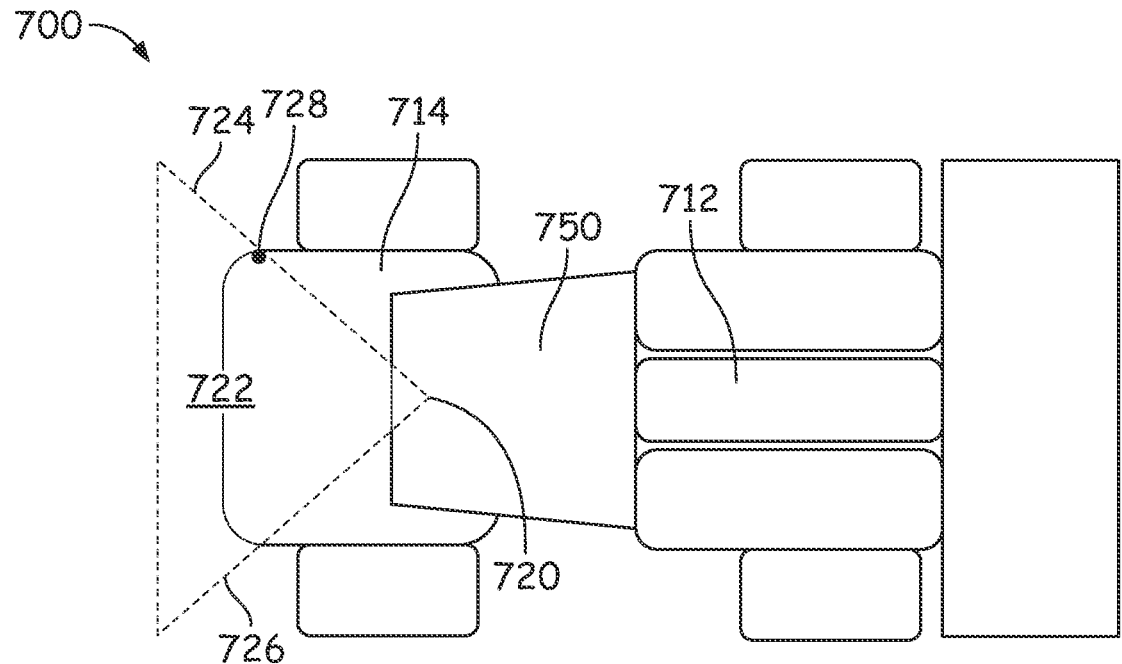
FIGS. 21 and 22 are schematic diagrams illustrating aspects of certain rearview vision systems for a power machine with an articulating frame according to an example of the disclosure.
Figure 22:
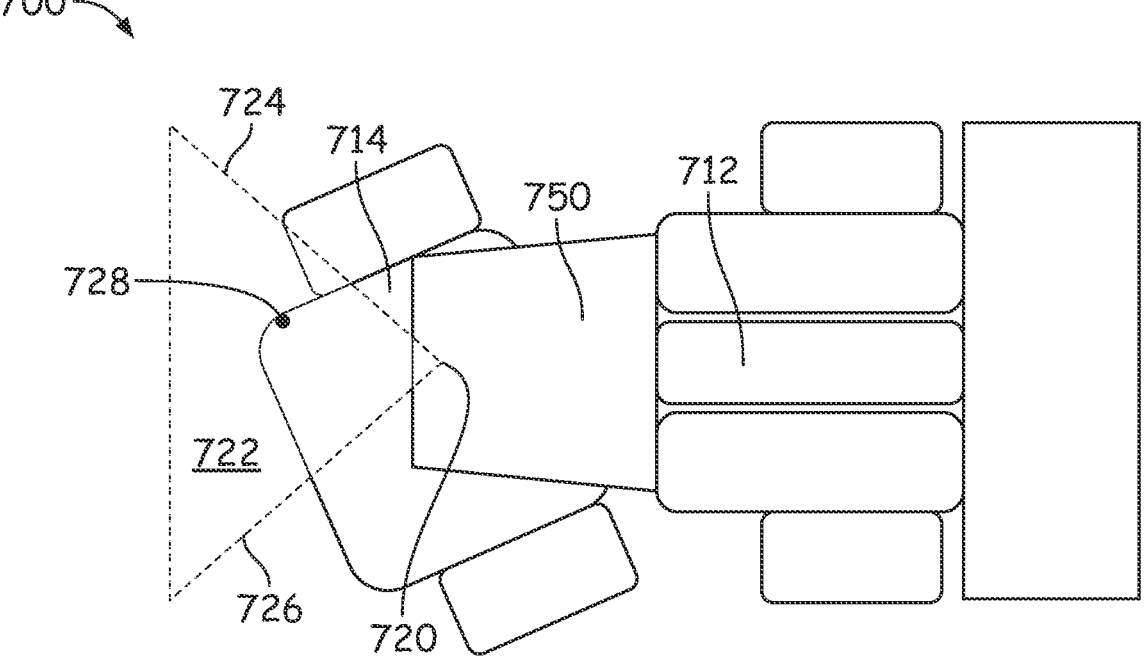

In contrast, FIGS. 21 and 22 illustrate a loader 700, according to an example of the disclosure, with the camera 720 of the rear vision system mounted to the operator station 750 (e.g., at mounting location 762, shown in FIG. 18)—or at least generally mounted to the front frame member 712. Thus mounted, the camera 720 can provide an operator a view of the area within a field of view 722 that is bounded by a first edge 724 and a second edge 726. Further, unlike the field of view 822 (see FIGS. 19 and 20), the field of view 722 can capture a position of the rear frame member 714 relative to the front frame member 712, including during steering operations. This arrangement can thus support improved situational awareness for an operator, including with respect to an imminent direction of travel of the loader 700.

In some examples, a field of view of a rearview camera can include a rear frame member over a full (or other) range of pivoting motion of a rear frame member relative to a front frame member (i.e., so that the rearview camera can capture images of the rear frame member of the range of motion). For example, as shown in FIG. 21, when the rear frame member 714 is in a neutral position with respect to the front frame member 712, a reference point 728 can be included in the field of view 722, at a point along the first edge 724 (e.g., a point on the rear end of the power machine that is furthest laterally removed from a centerpoint of the field of view, as shown in FIG. 21). Continuing, as shown in FIG. 22, when the rear frame member 714 is pivoted with respect to front frame member 712, including when the rear frame member is moved to a maximum articulation angle, the camera 720 does not move with the rear frame member 714. Thus, the field of view 722 does not rotate with the rear frame member 714 and, in some cases, at maximum articulation of the rear frame member 714, the reference point 728 can remain within the field of view 722.

In the example illustrated, the reference point 728 can be a feature located on rear frame member (e.g., a rear corner, or a top rear edge, etc.), so that a portion of the rear frame member will always be included in the field of view 722, regardless of a degree of a current turning operation. Further, a direction of travel of the loader 700 is generally determined by the direction in which the rear frame member 714 is oriented. Therefore, providing a view of the rear frame member 714 to an operator (e.g., via an in-cab display (not shown)) can provide useful context about the direction of travel of the loader 700 while the operator is backing up the machine. In other examples, however, the reference point 728 can be differently situated.

Further, in some examples, the camera 720 can be mounted so that multiple reference points remain within a field of view of the camera 720 during turning operations. For example, the camera 720 can be mounted so that the field of view 722 includes a second reference point with the power machine 700 in the neutral configuration and with the power machine 700 in a fully articulated configuration (e.g., a reference point at the center of the rear end of the loader 700, or a reference point laterally opposite the reference point 728). In some examples, the camera 720 can be mounted so that one or more reference points (e.g., as described above) remain within the field of view at all possible steering orientations of the rear frame member 714 of the power machine 700.

In the described example, the camera 720 is mounted with a fixed perspective relative to the front frame member 712. In other examples, however, a camera can be rotatable relative to a front frame. For example, some cameras can automatically rotate during particular driving (or other) operations or can be directly controlled based on operator inputs.

In some examples, as also discussed above, a power machine can be configured to operate in a float mode, including a float mode of a tilt actuator configured to adjust an attitude of an implement. In general, a lift arm can be pivotally coupled to a main frame of a power machine (e.g., an articulated loader), and an operator can provide a signal to a lift actuator to control an orientation of the lift arm relative to the main frame (e.g., as generally discussed relative to the lift arm assembly 230 of the articulated loader

200 shown in FIG. 2). In some power machines, one or more actuators of a lift arm can be placed in a float mode, in which both ends of the actuator are opened to a low pressure reservoir (such as a hydraulic tank) so that the lift arm (or another component thereof) can move under external loads (e.g., without any active resistance from powered systems of the power machine). (As used herein, a "lower pressure reservoir" refers to a reservoir with a pressure that is substantially below an operating pressure for a component. For example, an uncharged accumulator or an atmospheric hydraulic tank can be low pressure reservoirs relative to a hydraulic actuator for a loader or other power machine.)

Thus, for example, a loader can be readily used to perform back-dragging, during which an implement secured to an implement carrier of a lift arm is dragged along the ground as the power machine moves, with floating operation of the lift arm allowing the implement to trace the contours of and perform leveling on a portion of the ground. The weight of the lift arm structure, in this case can produce a downward force on the lift arm structure, keeping it in contact with the ground. Further, if the implement comes in contact with a ground structure or obstacle (e.g., a rock), the resulting upward force on the implement can rotate the lift arm relative to the main frame away from the ground.

Figure 23:
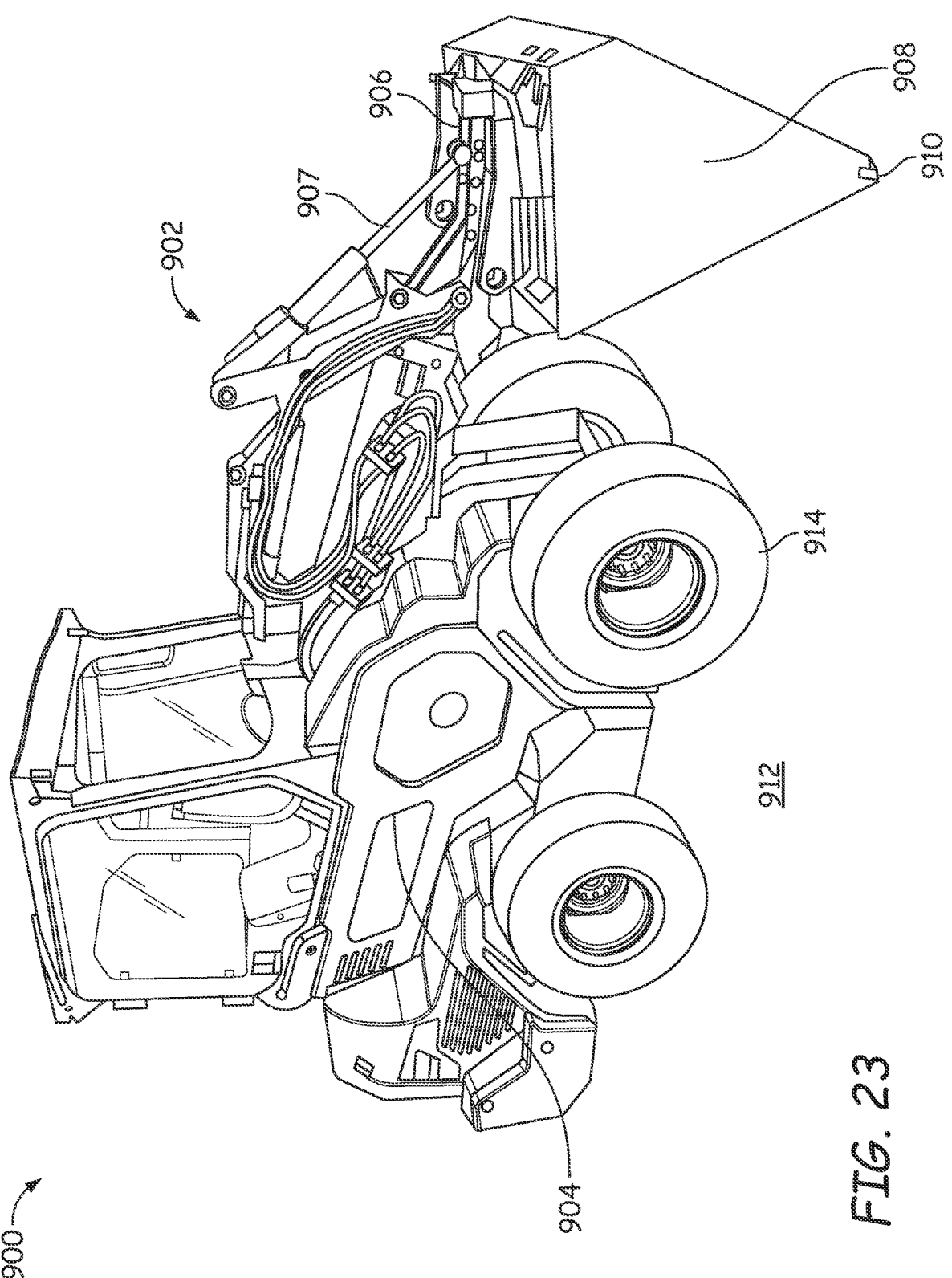
FIG. 23 is a perspective view of a power machine configured as an articulated loader performing a back-dragging operation, on which some examples can be advantageously practiced.

In some examples, a power machine can be operated with a tilt actuator in a float mode (e.g., instead of with a lift actuator in float mode). For example, a power machine 900 is shown in FIG. 23, with a lift arm assembly 902 mounted to a main frame 904 of the machine. The lift arm assembly includes an implement carrier 906 pivotably coupled to the lift arm assembly 902 and a tilt actuator 907 (e.g., similar to the tilt cylinder 278 of power machine 200). An implement 908 (e.g., a bucket, as illustrated) is fixedly attached to the implement carrier, and an edge 910 of the implement 908 is in contact with a ground surface 912. When a lift actuator (not shown) is in float mode, and the lift arm assembly is oriented at a sufficiently steep angle relative to a horizontal direction (e.g., at about a 50 degree angle below a horizontal direction parallel to the front-to-back axis B shown in FIG. 5), the forces on the edge 910 may not permit smooth float operation, potentially resulting in damage to the edge 910 or an undesirable lift force on the machine 900, in some cases causing an upward displacement of tractive elements 914 to be out of contact with the ground surface.

Some examples of a power machine 900 can address this and other problems, and generally provide greater functionality to an operator, by permitting operation in a float mode for a tilt actuator 907 of the machine 900. This can allow the implement carrier 906 to rotate relative to the lift arm assembly in response to external loads acting on the implement 908. Thus, when the tilt actuator 907 is in float mode, and the lift arm assembly 902 is, for example, at a fixed orientation relative to the frame 904, engagement of the implement 908 with the ground surface 912 and associated obstacles can cause the attitude of the implement 908 to float with respect to the lift arm assembly 902 so that the implement 908 can move relative to the lift arm assembly 902 in response to ground contact. Operation in a tilt float mode can allow for more favorable balancing of forces on a lift arm by allowing an implement to follow the contour of a terrain when performing an action where the machine is moving generally forward. One example of this type of operation would be the use of a snowblower, although many other potential applications exist. The use of tilt float in these types of applications helps to ensure smooth overall operations without undesired loss or gain of ground contact/ pressure at the tractive elements 914.

Figure 24:
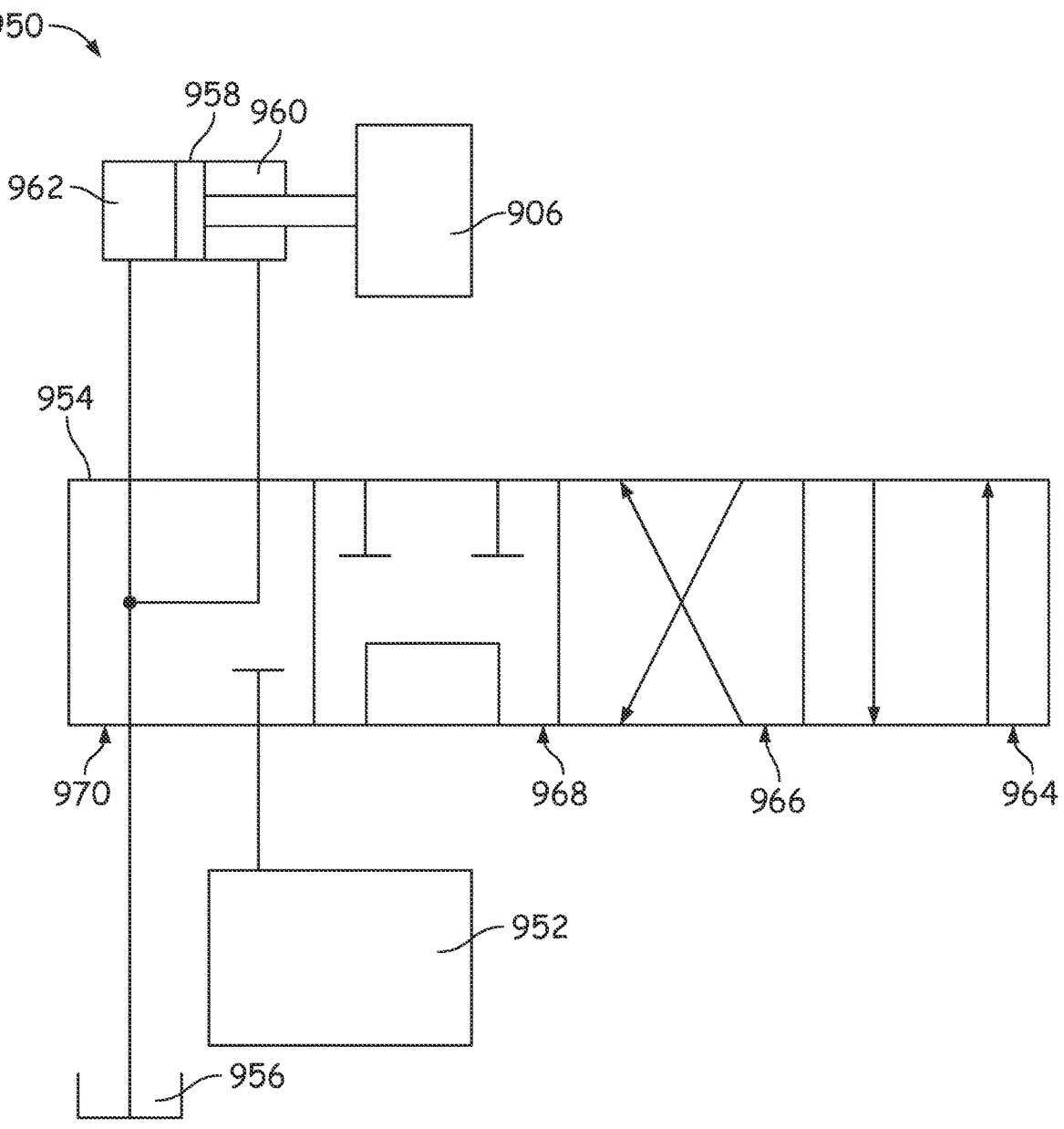
FIG. 24 is a schematic diagram illustrating aspects of a tilt float system for the articulated loader of FIG. 23, according to an example of the disclosure.

In different examples, tilt float mode can be implemented in different ways, including through hydraulic or electronic control of one or more tilt actuators. Generally, a tilt float mode can be implemented using a valve assembly and an associated hydraulic circuit to allow fluid to flow between compartments of a hydraulic cylinder, and a reservoir. In this regard, for example, FIG. 24 shows a simplified schematic of parts of a tilt float system 950, as can be implemented for the tilt actuator 907 (or other tilt actuators). In the illustrated example, the tilt float system 950 includes a pressure source 952 (e.g., an implement pump (not shown)), a control valve 954, a hydraulic reservoir 956, and a hydraulic tilt cylinder 958 (e.g., as included in the tilt actuator 907 of power machine 900). As shown, the tilt cylinder 958 can be coupled to an implement carrier 906 to control an attitude thereof relative to a lift arm (not shown) and can include a first compartment 960 and a second compartment 962 (e.g., at a base and a rod end, respectively, as shown).

In particular, the illustrated valve 954 is a four-position spool valve, corresponding to four operating modes of the tilt cylinder 958. In particular, in a first position 964, the valve 954 allows fluid communication between the pressure source 952 and the first compartment 960, and between the reservoir 956 and the second compartment 962, as can power the cylinder 958 to retract. In a second position 966, the valve 954 places the pressure source 952 in fluid communication with the second compartment 962 of the tilt cylinder 958, and the first compartment 960 is in fluid communication with the reservoir 956, as can power the cylinder 958 to extend. In a third position 968, the valve 954 can prevent fluid communication into or out of the first compartment 960 and the second compartment 962, thereby preventing movement of the cylinder 958 (e.g., to lock the cylinder 958 at a particular extension). Finally, in a fourth position 970, the valve 954 can allow free fluid communication between the first compartment 960, the second compartment 962 and the reservoir 956, thus allowing the cylinder to either retract or extend in response to external loads on the implement carrier 906 (i.e., allowing the cylinder to operate in a tilt float mode).

In some examples, the pressure source illustrated could be a hydraulic pump, in other examples the pressure source could be a hydraulic accumulator, while in yet other examples pressure could flow from other components of a power machine, including through other valves. While the schematic diagram of FIG. 24 illustrates the broad principles applicable to implementing a float mode in a hydraulic cylinder, the system could include valves and other hydraulic components in any number of arrangements, including between the spool valve 954 and the pressure source, the spool valve and the cylinder, and the spool valve and the reservoir. Similarly, a system for implementing a tilt float mode for a tilt cylinder could include a valve having fewer or more spool positions or could be implemented with an arrangement of several valves. Generally, any number of suitable valves can be used to implement a tilt float mode.

In some cases, the operator can place the tilt actuator in float mode using controls located in the operator station of the power machine. For example, an operator input can be provided at a lever control (e.g., a joystick), including by actuating one or more buttons or moving the lever to a detent position, to place a tilt actuator in a select one of any number of operational modes (e.g., a tilt float mode). In some examples, an initial displacement of a joystick (e.g., laterally) can place a tilt actuator in a powered mode of operation, and a further displacement of the joystick (e.g., past a threshold position) can place the tilt actuator in tilt float mode. In some cases, releasing the joystick can then cause a return to a neutral position, at which the tilt actuator is no longer in float mode. However, other configurations are possible, and controls to put the tilt actuator in tilt mode could include levers, pedals, buttons, switches, and the like.

Although the presently disclosed technology has been described with reference to preferred examples, workers skilled in the art will recognize that changes may be made in form and detail to the disclosed examples without departing from the spirit and scope of the concepts discussed herein.

As used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

As used herein in the context of a power machine, unless otherwise defined or limited, the term "lateral" refers to a direction that extends transversely to a particular reference line (e.g., a flow path direction, a front-to-back reference line defined by the power machine, etc.). Accordingly, for example, a lateral side wall of a cab of a power machine, relative to a front-to-back reference direction, can be a left side wall or a right side wall of the cab (e.g., a vertical or an angled side wall on a left or right lateral side of the cab), relative to a frame of reference of an operator who is within the cab or is otherwise oriented to operatively engage with controls of an operator station of the cab. Likewise, a lateral direction relative to an axial flow path can be a radial direction relative to the flow path. Also as used herein, a "centerline" of a power machine refers to a reference line that extends in a front-to-back direction of a power machine, approximately half-way between opposing lateral sides of an outer spatial envelope of the power machine.

Also as used herein, unless otherwise defined or limited, the terms "about" and "approximately", with respect to a reference value, refer to variations from the reference value of ±20% or less (e.g., ±15, ±10%, ±5%, etc.), inclusive of the endpoints of the range. Similarly, as used herein with respect to a reference value, the term "substantially equal" (and the like) refers to variations from the reference value of less than ±5% (e.g., ±2%, ±1%, ±0.5%) inclusive. Where specified in particular, "substantially" can indicate a variation in one numerical direction relative to a reference value. For example, the term "substantially less" than a reference value (and the like) indicates a value that is reduced from the reference value by 30% or more (e.g., 35%, 40%, 50%, 65%, 80%), and the term "substantially more" than a reference value (and the like) indicates a value that is increased from the reference value by 30% or more (e.g., 35%, 40%, 50%, 65%, 80%).

Relatedly, "substantially parallel" indicates a direction that is within ±12 degrees of a reference direction (e.g., within ±6 degrees or ±3 degrees), inclusive. Correspondingly, "substantially vertical" indicates a direction that is substantially parallel to the vertical direction, as defined relative to the reference system (e.g., for a power machine, as defined relative to a horizontal support surface on which the power machine is operationally situated), with a similarly derived meaning for "substantially horizontal" (relative to the horizontal direction). "Substantially perpendicular" indicates a direction that is within ±12 degrees of perpendicular a reference direction (e.g., within ±6 degrees or ±3 degrees), inclusive.

In some implementations, devices or systems disclosed herein can be utilized, manufactured, installed, etc. using methods embodying aspects of the disclosed technology. Correspondingly, any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as examples of the disclosed technology, of the utilized features and implemented capabilities of such device or system.

In some examples, aspects of the disclosed technology, including computerized implementations of methods according to the disclosed technology, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, some examples of the disclosed technology can be implemented as a set of instructions, tangibly embodied on a non-transitory computer-readable media, such that a processor device can implement the instructions based upon reading the instructions from the computer-readable media. Some examples of the disclosed technology can include (or utilize) a control device such as an automation device, a special purpose or general purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.). In some examples, a control device can include a centralized hub controller that receives, processes and (re)transmits control signals and other data to and from other distributed control devices (e.g., an engine controller, an implement controller, a drive controller, etc.), including as part of a hub-and-spoke architecture or otherwise.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the disclosed technology, or of systems executing those methods, may be represented schematically in the FIGS. or otherwise discussed herein. Unless otherwise specified or limited, representation in the FIGS. of particular operations in particular spatial order may not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular examples of the disclosed technology. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," "block," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

What is claimed is:

1. A power machine comprising:
   a main frame that includes a front frame member and a rear frame member pivotally coupled to the front frame member, the front frame member supporting an operator station that includes a cab having a lateral side wall on a first lateral side of the power machine;
   a work element supported by the main frame and configured to be controllably operated using power from a power source supported on the main frame; and
   a climate control system for regulating temperature for the operator station, the climate control system including a condenser for rejecting heat from the climate control system, the condenser being supported by the front frame member, secured to the lateral side wall, and located at least partly forward of the operator station.

2. The power machine of claim 1, wherein a rotational axis of a fan of the condenser extends transverse to a front-to-back axis of the main frame.

3. The power machine of claim 1, wherein the condenser is hingedly secured to the lateral side wall.

4. The power machine of claim 1, wherein the power source is supported on the rear frame member.

5. A power machine comprising:

a main frame that supports a power system for the power machine within an internal area of the power machine, the power system including an engine;

a work element supported by the main frame and configured to be controllably operated using power from the engine;

a vent aligned to direct air flow from outside of the main frame into the internal area to cool the engine; and a fluid tank for the power system aligned between the engine and the vent, the fluid tank including one or more external walls that define an internal fluid storage volume and one or more airflow passages that extend through the fluid tank, being at least partly bounded by at least one of the one or more external walls, to provide air flow to cool the engine.

6. The power machine of claim 5, wherein at least one of the airflow passages is fully laterally bounded by the at least one of the external walls, relative to a flow direction of the air flow through the at least one of the airflow passages.

7. The power machine of claim 5, wherein the one or more airflow passages include a first airflow passage and a second airflow passage, spaced apart from each other in a front-to-back direction of the power machine so that the internal fluid storage volume extends between the first and second airflow passages.

8. The power machine of claim 7, wherein the first airflow passage is vertically offset relative to the second airflow passage.

9. The power machine of claim 5, wherein at least one component of the power system of the power machine extends into at least one of the one or more airflow passages.

10. The power machine of claim 5, wherein the main frame includes a front frame member and a rear frame member pivotally coupled to the front frame member.

11. The power machine of claim 5, wherein the fluid tank is a fuel tank for the engine.

12. A fuel tank for a power machine, the fuel tank comprising:

an outer shell that defines an internal fuel storage volume;

wherein the outer shell includes at least one airflow passage that is laterally, relative to a flow direction through the at least one airflow passage, surrounded by the internal fuel storage volume to provide a flow path for cooling air flow for an engine of the power machine.

13. The fuel tank of claim 12, wherein the outer shell includes a plurality of airflow passages to provide a plurality of flow paths for the cooling air flow.

14. The fuel tank of claim 13, wherein one or more of a fuel pickup or a fuel sensor extends through the internal fuel storage volume between at least two of the flow paths.

15. A power machine comprising:

a main frame that includes a front frame member and a rear frame member pivotally coupled to the front frame member about a vertical axis;

a work element supported by the main frame and configured to be controllably operated using power from a power source supported by the main frame; and a rearview vision system including a camera supported by the front frame member to provide a rearward view.

16. The power machine of claim 15, wherein the front frame member supports an operator station with an operator station frame and the camera is supported by the operator station frame to provide a rearward view that includes at least part of a rear exterior body supported by the rear frame member.

17. The power machine of claim 16, wherein the camera is supported by the operator station frame so that the rearward view includes a top rear edge of the rear exterior body.

18. The power machine of claim 16, wherein the camera is secured to the operator station frame so that an imaging sensor of the camera is within a distance from a top of the operator station frame that is 20% or less of a total height of the power machine.

19. The power machine of claim 18, wherein the camera is secured to the operator station frame so that the imaging sensor of the camera is within a distance from a top of the operator station frame that is 5% or less of a total height of the power machine.

20. The power machine of claim 19, wherein the camera is secured to the operator station frame so that the imaging sensor of the camera is within a distance from a top of the operator station frame that is 3% or less of a total height of the power machine.

21. The power machine of claim 18, wherein the camera is supported by the operator station frame so that:

with the power machine in a neutral orientation, a field of view of the camera defines a reference point at a back end of the power machine that is furthest laterally removed from a centerpoint of the field of view, relative to a front-to-back direction; and with the power machine in a minimum turn-radius orientation, the reference point remains within the field of view.

22. A power machine comprising:

a main frame that includes a front frame member and a rear frame member pivotally coupled to the front frame member about a vertical axis, the front frame member supporting an operator station with an operator station frame, and the rear frame member supporting a power source for the power machine and a rear exterior body;

a work element supported by the main frame and configured to be controllably operated using power from the power source; and a rearview vision system including a camera supported adjacent a top of the operator station frame to provide a rearward view that includes at least part of the rear exterior body.

* * * * *